(12) United States Patent
Gonda

(10) Patent No.: US 8,730,822 B2
(45) Date of Patent: May 20, 2014

(54) METHOD FOR SUPPORTING SDH/SONET OAMP ON ETHERNET

(76) Inventor: Rumi Sheryar Gonda, Boxborough, MA (US)

( * ) Notice: Subject to any disclaimer, the term of this patent is extended or adjusted under 35 U.S.C. 154(b) by 330 days.

(21) Appl. No.: 13/197,560

(22) Filed: Aug. 3, 2011

(65) Prior Publication Data

US 2011/0286338 A1 Nov. 24, 2011

Related U.S. Application Data

(63) Continuation of application No. 12/696,639, filed on Jan. 29, 2010, now Pat. No. 8,018,857, which is a continuation of application No. 10/713,385, filed on Nov. 13, 2003, now Pat. No. 7,693,078.

(51) Int. Cl.
*H04L 12/28* (2006.01)

(52) U.S. Cl.
USPC ............................................. 370/241.1

(58) Field of Classification Search
USPC .................. 370/236.2, 241–246, 247–253, 370/395.1–395.53, 465–467
See application file for complete search history.

(56) References Cited

U.S. PATENT DOCUMENTS

| | | | | |
|---|---|---|---|---|
| 5,289,469 | A | 2/1994 | Tanaka | 370/469 |
| 5,590,285 | A | 12/1996 | Krause et al. | 709/218 |
| 6,098,103 | A | 8/2000 | Dreyer et al. | 709/234 |
| 6,157,623 | A * | 12/2000 | Kerstein | 370/315 |
| 6,510,454 | B1 | 1/2003 | Walukiewicz et al. | |
| 6,766,482 | B1 | 7/2004 | Yip et al. | 714/717 |
| 6,775,804 | B1 | 8/2004 | Dawson | 714/776 |
| 6,888,791 | B1 * | 5/2005 | Ellis et al. | 370/227 |
| 6,992,975 | B1 | 1/2006 | Daniel et al. | 370/222 |
| 7,068,663 | B1 | 6/2006 | Adler | 370/395.51 |
| 7,102,995 | B2 | 9/2006 | Gonda | 370/224 |
| 7,177,325 | B2 | 2/2007 | Claseman | 370/469 |
| 7,227,844 | B1 * | 6/2007 | Hall et al. | 370/242 |
| 7,428,209 | B1 * | 9/2008 | Roberts | 370/217 |
| 7,606,886 | B1 | 10/2009 | Bechtolsheim et al. | 709/223 |
| 2002/0133622 | A1 | 9/2002 | Pinto | 709/242 |
| 2003/0002512 | A1 | 1/2003 | Kalmanek et al. | |
| 2003/0103522 | A1 | 6/2003 | Hane | 370/462 |
| 2003/0137975 | A1 | 7/2003 | Song et al. | |
| 2003/0152079 | A1 * | 8/2003 | Loeffler et al. | 370/392 |
| 2003/0235214 | A1 | 12/2003 | Leroux et al. | 370/504 |

(Continued)

OTHER PUBLICATIONS

Robert, Muir et al, OAM&P for EFM, May 21-23, 2001, IEEE 802.3 EFM Study Group, pp. 1-14.

(Continued)

*Primary Examiner* — Andrew Chriss
*Assistant Examiner* — Kenan Cehic
(74) *Attorney, Agent, or Firm* — Morse, Barnes-Brown & Pendleton, P.C.; Sean D. Detweiler, Esq.

(57) ABSTRACT

An Ethernet MAC OAMP Control sublayer is provided for supporting SDH/SONET OAMP standard functionality in Ethernet Networks. In accordance with one embodiment, an Ethernet MAC OAMP Control sublayer is provided for processing Ethernet MAC OAMP Control frames. The MAC OAMP Control sublayer provides support for a MAC OAMP Client to implement all of the SDH/SONET OAMP standard functionality. The MAC OAMP Control frame provides support for SDH/SONET OAMP on Ethernet networks. The Network Equipment can use the MAC OAMP Control frames to communicate with the downstream and upstream Network Equipment about various OAMP events, requests, performance parameters, communications channels, maintenance, and test functionality.

8 Claims, 10 Drawing Sheets

(56) References Cited

U.S. PATENT DOCUMENTS

| | | | |
|---|---|---|---|
| 2004/0017965 A1 | 1/2004 | Abe | 385/24 |
| 2004/0022185 A1 | 2/2004 | Wils et al. | 370/226 |
| 2004/0085905 A1 | 5/2004 | Lim et al. | 370/236.2 |
| 2004/0114924 A1 | 6/2004 | Holness et al. | 398/33 |
| 2004/0165534 A1 | 8/2004 | Claseman | 370/241.1 |
| 2004/0184474 A1 | 9/2004 | Kim et al. | 370/445 |
| 2005/0053006 A1 | 3/2005 | Hongal et al. | 370/236.2 |
| 2005/0099949 A1 | 5/2005 | Mohan et al. | |
| 2005/0099951 A1 | 5/2005 | Mohan et al. | |
| 2005/0099952 A1 | 5/2005 | Mohan et al. | |
| 2005/0099954 A1 | 5/2005 | Mohan et al. | |
| 2005/0099955 A1 | 5/2005 | Mohan et al. | |
| 2005/0100026 A1 | 5/2005 | Mancour | 370/400 |
| 2006/0227794 A1 | 10/2006 | Shivnan | 370/400 |
| 2007/0263631 A1 | 11/2007 | Mallory | 370/394 |
| 2008/0095083 A1 | 4/2008 | Sorenson et al. | 370/295 |

OTHER PUBLICATIONS

"Metro Ethernet Marches On" [online], [retrieved on Sep. 11, 2009]. Retrieved from the internet: <URL: http://www.tmcnet.com/news/2009/01/20/3926541.htm.

Hoekman, R., "Building Large Metro Ethernets Requires MPLS," [online], [retrieved on Sep. 11, 2009]. Retrieved from the internet: <URL: http://www.convergedigest.com/bp-me/bp1.asp?ID=168&ctgy.

Krapf, E., "Metro Ethernet: Still on the Horizon," [online], [retrieved on Sep. 11, 2009], Retrieved from the internet: <URL: http://cache.zoominfo.com/...&page_last_updated=6%2f21%2f2002+12%3a45%3a13+PM&firstName=Jay&lastName=Shuler.

Unconfirmed EFM Study Group May 21-23 Interim Meeting Minutes (May 21, 2001).

International Search Report for Application No. PCT/US04/37923, dated Oct. 1, 2007.

Barrett e al. "EFM OAM Baseline Transport Proposal." May 20, 2002, pp. 1-19 retrieved from internet http://grouper.ieee.org/groups/802/3/efm/public/may02/squire_2_0502.pdf.

Gentry "OAM in frames." Dominet Systems, Jan. 14, 2002, pp. 1-22 retrieved from Internet http://grouper.ieee.org/groups/802/3/efm/public/email/msg01326.html.

Frazier et al. "Ethernet in the first mile." EFM OAM slideshow, IEEE Oakland/East Bay Comminations Society, Oct. 17, 2003.

Fujitsu Network Communications, Inc. "Fujitsu delivers wide range of telecommunication topics at NFOEC 2003." pp. 1-2 retrieved from Internet on Oct. 2, 2003 http://us.fujitsu.com/news/PR/BwBFeCA7s1.html.

International Telecommunication Union, ITU-T Study Group, "Liaison statement." pp. 1-2 retrieved from Internet on Oct. 2, 2003 http://ties.itu.int/ftp/itu-t/com15/tsg15opticaltransport/tsg15opticaltransport/COMMUNICATIONS/.

Nuss "Carrier-grade Ethernet." Internet Photonics, date unknown, pp. 1-16 http://www.internetphotonics.com/news/external_presentations.shtml.

Ohta "General principles and requirements for OAM functions," Powerpoint presentation, Jul. 10, 2002, pp. 1-26.

PMC-Sierra, Product details for PM3393 (S/UNI®-1x10GE-XP) Single chip 10 gigabit Ethernet LAN PHY for XAUI-based optics retrieved from Internet on Oct. 2, 2003 http://www.pmc-sierra.com/products/details/pm3393.

Squire "Metro Ethernet forum OAM." Hatteras Networks, Jun. 2003, pp. 1-24 http://www.metroethernetforum.org/Presentations.htm.

Suzuki et al. "EFM OAM on preamble," IEEE802.3ah EFM Task Force, Jan. 2002, p. 1-16.

Email posts on listserv in 2002 regarding [EFM] OAM transport proposal http://www.ieee802.org/3/efm/public/email.

Email posts on listserv in 2002 between Roy Bynum and Bob Barrett regarding [EFM] This is the Ethernet Bob but not as we know it.

Micrel Semiconductor "Fast Ethernet media converters." p. 1 retrieved from Internet on Oct. 2, 2003 http://www.micrel.com/product-info/fastether_medconv.shtml.

\* cited by examiner

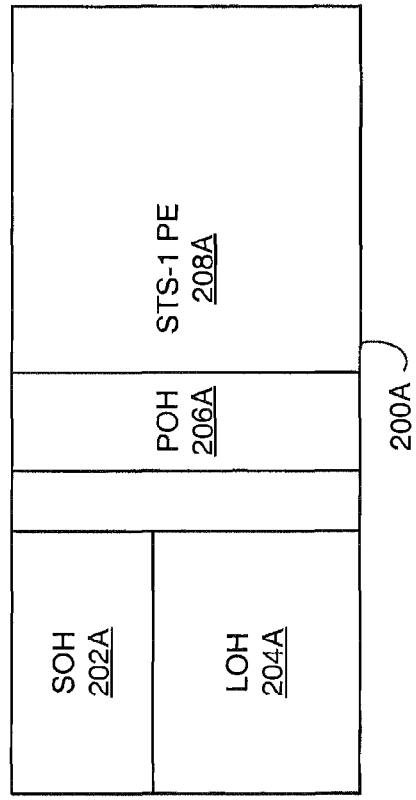 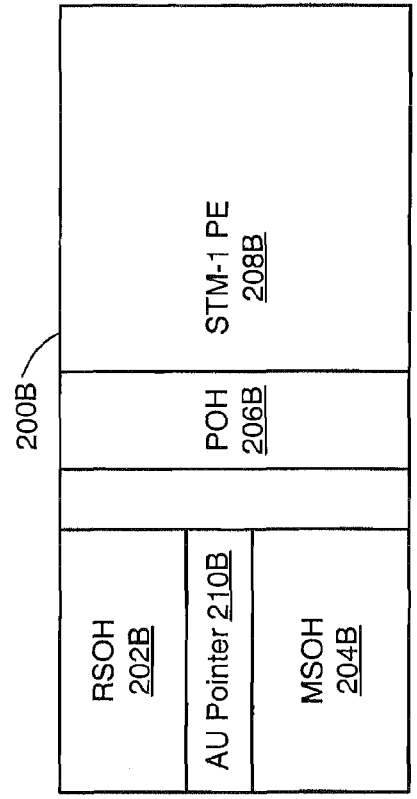
FIG. 2A (Prior Art)
FIG. 2B (Prior Art)

| MAC Control Opcode 606D = AIS type | 2 bytes |
| MAC Control Parameters 607D (opcode specific) | |
| MS-AIS/AIS-L 608D | 1 byte |
| AU-AIS/AIS-P 609D | 1 byte |
| TU-AIS/AIS-V 610D | 1 byte |
| (V5)AIS/AIS-DSn 611D | 1 byte |

| MAC Control Opcode 606E = RDI type | 2 bytes |
| MAC Control Parameters 607E (opcode specific) | |
| MS-RDI/RDI-L 608E | 1 byte |
| HP-RDI/RDI-P 609E | 1 byte |
| LP-RDI/RDI-V 610E | 1 byte |
| RDI-DSn 611E | 1 byte |
| PDI-P 612E | 1 byte |
| PDI-V 613E | 1 byte |

| MAC Control Opcode 606F = Loopback type | 2 bytes |
| MAC Control Parameters 607F (opcode specific) | |
| Internal 608F | 1 byte |
| Facility 609F | 1 byte |

METHOD FOR SUPPORTING SDH/SONET OAMP ON ETHERNET

RELATED APPLICATION

This application claims priority to and is a continuation of U.S. application Ser. No. 12/696,639, filed Jan. 29, 2010, now U.S. Pat. No. 8,018,857, which is a continuation of U.S. application Ser. No. 10/713,385, filed Nov. 13, 2003 now U.S. Pat. No. 7,693,078. All said applications are expressly and entirely incorporated herein by reference. Furthermore, this application the benefit of said applications for all subject matter common thereto.

FIELD OF THE INVENTION

The present invention relates generally to network switching architecture and more specifically to supporting SDH/SONET Operations, Administration, Maintenance, and Provisioning, (OAM&P) functionality in an Ethernet network.

BACKGROUND OF THE INVENTION

SDH/SONET (Synchronous Digital Hierarchy/Synchronous Optical Network) standards evolved originally for use in a voice network. SDH is a European version of a standard that is substantially the same as the SONET standard developed in North America. SDH/SONET contains connection oriented synchronous TDM circuit switching technology. The SDH/SONET configured network runs at the same clock domain (e.g., every section of the network can be traced to a primary clock reference). The network allocates fixed bandwidth time slots for each circuit. The SDH/SONET architectures are connection based protocols in that there is a physical circuit arrangement between ports in a switch to establish an end to end path. The digital transitions in signals traveling through an SDH/SONET network occur at the same rate, however there may be a phase difference between the transitions of any two signals caused by time delays or jitter in the transmission system.

Ethernet evolved primarily as a data network. In contrast to SDH/SONET, Ethernet is a connectionless asynchronous Carrier Sense, Multiple Access with Collision Detection (CSMA/CD) packet switching technology. The Ethernet architecture does not rely on a single clock domain like the SDH/SONET architecture. The Ethernet architecture sends a series of packets across the network containing data. Whenever a packet needs to be sent, the transmitter will try to transmit the packet. The Ethernet architecture is also connectionless in that the packets travel from node to node within the network without establishing a logical or physical circuit. The end to end path is discovered through a process called "Bridging". Ethernet is fundamentally a Local Area Networking (LAN) technology.

SDH/SONET networks provide reliable, guaranteed available bandwidth, low jitter connections. These characteristics are required for voice quality networks. SDH/SONET, however, is bandwidth inefficient and has a higher overhead than many other network architectures. Ethernet networks, in contrast, provide lower reliability best effort delivery, and low cost bandwidth connections. These characteristics are suitable for data quality networks. Ethernet has non-guaranteed transmission and low overhead and supports fewer operational functions than SDH/SONET. In SDH/SONET, once the circuit is established, bandwidth is allocated for an application and cannot be used by any other application, even if the original application is not using the bandwidth. In Ethernet, applications only use bandwidth when they need the bandwidth to transmit packets.

In SDH/SONET networks, Operations, Administration, Maintenance, and Provisioning (OAM&P or OAM) functionality is known. OAM&P involves all aspects of the day-to-day operations and fault detection in all parts of the SDH/SONET network. SDH/SONET standards define OAM&P procedures to detect the problems and resolve them. These can include configuration issues, performance statistics, network management, customer support, trouble tracking, performance evaluation, configuration management, technical support, and billing. SDH/SONET Standards define overhead bits in the SDH/SONET frame structure to carry OAM&P information, alarms, and commands; and extensive performance statistics and monitoring information.

In SDH networks OAM functions are performed by three sets of SDH overhead octets/bytes. These are path, multiplex section, and regenerator section overhead octets. SDH Section Overhead (SOH) bytes are classified into Regeneration Section Overhead (RSOH) which terminates at regenerator functions and Multiplex Section Overhead (MSOH) which passes transparently through the regenerators and is terminated where the Administrative Unit Group (AUG-N) are assembled and disassembled. SDH Path Overhead (POH) bytes provides for integrity of communication between the point of assembly of Virtual Container (VC) and its point of disassembly. Two categories of Virtual Container POH have been identified. Higher order Virtual container POH and Lower order Virtual Container.

In SONET networks OAM&P functions are performed by three sets of SONET overhead octets/bytes. There are path, line, and section overhead bytes. SONET Transport Overhead (TOH) bytes are classified into Section Overheard (SOH) which terminates at Section Layer functions and Line Overhead (LOH) which passes transparently through the Section Layer and is terminated where the SONET (SPE) payloads are assembled and disassembled. SONET Path overhead (POH) provide end-to-end OAM&P functions. The POH is passed unchanged through the SONET Line, Section, and Physical Layers. SONET POH bytes are defined for SONET Transport Signal (STS) path and Virtual Tributary (VT) low rate path levels. SONET Physical layer is a transport layer and does not have overhead associated with it.

SDH and SONET Standards are similar in functionality but have different terminology. The mapping of terminology of the two standards is well known in the industry.

In voice networks, SDH/SONET OAMP Standard functionality provides the architecture for administration, configuration issues, performance statistics, network management, customer support, trouble tracking, performance evaluation, configuration management, technical support, and billing. In order for data networks to be able to support carrier operations requirements, the data network must be able to provide the same level of OAMP support. Ethernet is the most common data network data link layer protocol. There is no Ethernet standard to provide OAMP functionality.

In Ethernet networks, several working groups are working on trying to define Ethernet standards to support various levels and forms of OAMP support in Ethernet.

The IEEE 802.3ah Ethernet First Mile (EMF) OAM group, which deals only with the first mile Ethernet support, has two proposals that are being debated. One proposal is to use "slow protocol" MAC frames to support limited OAM functionality for a single Ethernet link. Another proposal is to add additional OAM field in front of every Ethernet frame at the Physical Layer.

The Metro Ethernet Forum (MEF) group also has proposals to support OAM using MPLS protocol. The preliminary proposal is recommending using user/data Ethernet packets with specific VLAN tag to define MEF Ethernet OAM information.

The ITU-T Q.3 SG13 is also studying various options to support OAM in Ethernet networks. It is also working with EFM. It has only defined the requirements so far.

Most of the above mentioned technologies solve limited functionality for Ethernet. Typically, they support only limited OAMP functionality and, also are limited to Ethernet Links, such as link failure alarms and a small set of performance monitoring statistics. They address only a subset of the capabilities as defined by the SDH/SONET OAMP standard. Using the same techniques as used in existing SDH/SONET networks, allows for easier migration and coexistence of both SDH/SONET and Ethernet networks. One network management can support both networks transparently, and not need to retrain network operators in new operations methods.

SUMMARY OF THE INVENTION

There is a need in the art for OAMP functionality on an Ethernet network as defined by the SDH/SONET OAMP standard. The present invention is directed toward further solutions to address this need. The present invention can also support additional OAMP functionality not defined by SDH/SONET standards, such as, Service Level Management (SLA), and the like.

In accordance with one example embodiment of the present invention, Media Access Control (MAC) hardware for supporting MAC Operations, Administration, Maintenance and Provisioning (OAMP) functionality has a MAC OAMP Control sublayer and a plurality of MAC sublayers.

In accordance with example aspects of the present invention, Ethernet Architecture can include Wave, Physical, Section, Line, and Path Layers. Depending on the Network Equipment (NE) functionality in the Ethernet Network, a NE can process all the OAMP information for the layer it terminates and all the layers below it. A NE can also monitor OAMP information for a layer it does not terminate.

In accordance with example aspects of the present invention, the plurality of MAC sublayers further includes a Link Aggregation sublayer. The plurality of MAC sublayers can further include at least one MAC OAMP Control sublayer. The MAC OAMP Control sublayer can be located within a MAC. A MAC Control Layer can process optional VLAN tags in control frames. The MAC OAMP Control sublayer can be implemented in MAC hardware. The MAC OAMP Control sublayer supports wave, physical, section, line, and path OAMP functions based on the context of the network equipment in which the MAC is being used. The MAC OAMP Control sublayer supports OAMP for logical links formed by a Link Aggregation sublayer. The MAC OAMP Control sublayer supports OAMP for physical links. The MAC OAMP Control sublayer supports OAMP for Network Layer paths. A MAC sublayer can be implemented in at least one of an Ethernet Switch device and an Ethernet MAC device. The MAC OAMP Control sublayer processes an Ethernet MAC OAMP Control frame. The MAC OAMP Control sublayer maintains an Ethernet MAC OAMP Control state.

In accordance with further aspects of the present invention, a MAC OAMP Control sublayer, based on the context of the Ethernet NE, can create, modify, and monitor the corresponding wave, physical, section, line, and path MAC OAMP Control frames and their information. The overhead bytes are used to signal between NE and Ethernet MAC OAMP layers.

The OAMP signals can be used for fault isolation and take corrective actions. The MAC OAMP Control sublayer provides support for Alarm Indicator Signals, Remote Defect Indications, Automatic Protection Switching, Loopbacks, Performance Monitoring, Trace signals, Sync signal, Bit Error Rate Test, Data Communication Channel, Orderwire, and various other OAMP operations. The MAC OAMP Control sublayer can be used to support OAMP functions in mesh and ring topology. The MAC OAMP Control sublayer can be used to support pass through mode for OAMP control frames. The MAC OAMP Control sublayer can also support additional OAMP functionality not defined by SDH/SONET standards, such as, Service Level Management (SLA), and the like.

In accordance with further aspects of the present invention, the MAC OAMP Control sublayer generates an interrupt when an OAMP frame is detected to invoke a MAC OAMP Client. The MAC OAMP Control sublayer generates an interrupt when an OAMP state change is detected to invoke the MAC OAMP Client. The MAC OAMP Control sublayer interacts with an Ethernet MAC OAMP Client. When an appropriate alarm is received the MAC OAMP Control sublayer can also signal the Physical Layer or a MAC sublayer or any other APS device to cause a switchover when protection switching is configured. The MAC OAMP Client manages the state of the OAMP and reacts to various errors, OAMP events or commands. The MAC Client can also maintain performance statistics, monitoring, and various other operations functions. The MAC OAMP Client can be implemented in software and/or hardware layers.

In accordance with another aspect of the present invention, an Ethernet PHY hardware device includes at least one physical sublayer. One of the at least one physical sublayers generates an interrupt when a port/link failure is detected to invoke a MAC OAMP Client. Two or more physical sublayers can be configured in redundant mode to support protection switchover. One of the at least one physical sublayers maintains status for soft failures, such as bit error rates greater than some predetermined configured thresholds.

In accordance with another aspect of the present invention an Ethernet MAC OAMP Control Frame for supporting SDH/SONET OAMP Signaling Protocol includes a standard Ethernet frame Preamble field. Further elements of the MAC OAMP Control Frame include a standard Ethernet Start-of-Frame Delimiter field, a standard Ethernet Destination MAC address field, a standard Ethernet Source MAC address field, an optional standard Ethernet VLAN Tag field, a standard Ethernet Type field, a standard Ethernet MAC Control Opcode field, a plurality of standard Ethernet MAC Control Parameters being opcode specific, and a standard Ethernet Frame Check Sequence field.

In accordance with further aspects of the present invention the Ethernet MAC Control Opcode field further includes an ability to distinguish between a wave, physical, section, logical link/line, a physical link/line, and a path OAMP requests and responses. In addition, the plurality of Ethernet MAC Control Parameters further include OAMP fields, a Port ID field, a Slot ID field, a Chassis ID field, a Bridge ID field, a Node ID/IP field, and a Reserved field containing zero or more octets of zero value.

In accordance with further aspects of the present invention the Ethernet MAC OAMP Control frame Opcode field can be defined based on Wave, Physical, Section, Line (Physical and Logical), and Path frames. The Control Parameters field can contain the standard SDH/SONET overhead bytes for the corresponding layers. Additional Ethernet specific MAC OAMP Control frame Opcode field and Control Parameters can be defined.

In accordance with further aspects of the present invention the Ethernet MAC OAMP Control frame Opcode field and Control Parameter field can be defined based on OAMP functional classification. Opcodes can be defined for Alarm Indicator Signal (AIS), Remote Defect Indication (RDI), Automatic Protection Switching, Loopback, Performance Monitoring (PM), Trace, Sync, Bit Error Rate Test (BERT), etc., functions as described in SDH/SONET standards. The Control Parameter fields can use SDH/SONET standard values to indicate the status of the function.

In accordance with further aspects of the present invention the Ethernet MAC Control frame Opcode field and Control Parameter field can be defined based on OAMP events individually. Opcodes can be defined for declaring and clearing of events such as AIS-L, AIS-P, RDI-L, RDI-P, APS, equipment failure, far end performance monitoring parameters, and the like.

In accordance with further aspects of the present invention the Ethernet MAC Control frames can be defined by a combination of previously defined embodiments.

In accordance with further aspects of the present invention, an Ethernet MAC Client includes at least one MAC Client. The MAC Client includes at least one of a network layer protocol and a forwarding function for switches. The MAC Client can also include at least one MAC OAMP Control Client.

In accordance with another aspect of the present invention, a method of providing OAMP functionality on MAC hardware and PHY hardware includes detecting a failure along a first link on a near end network node. A Physical Layer generates a signal to the MAC OAMP Control sublayer. The MAC OAMP Control sublayer can react to the failure detected and respond with appropriate OAMP response within the required response times. The actions can include sending alarm signals up and down streams and/or to switchover within 50 ms in case protection is configured.

In accordance with another aspect of the present invention, a method of providing OAMP functionality on MAC hardware and PHY hardware includes detecting a failure along a first link on a near end network node. A Physical Layer generates an interrupt when a port/link failure is detected to invoke a MAC OAMP Client. The MAC OAMP Client can react to the failure detected and respond with appropriate OAMP response within the required response times. The actions can include sending alarm signals up and down streams and/or to switchover in 50 ms in case protection is configured.

In accordance with another aspect of the present invention, a method of providing OAMP functionality on MAC hardware and the MAC OAMP Control sublayer includes monitor and/or processing the OAMP Control frames depending on the configured terminating layer of MAC hardware in the network equipment. The OAMP Control frame can be retransmitted or pass through based on the OAMP function and/or the pass through configuration.

In accordance with another aspect of the present invention, a method of providing OAMP functionality on a MAC hardware device includes a near end MAC OAMP Control sublayer receiving a MAC OAMP Control Frame containing OAMP information from a MAC OAMP Control Frame buffer. The near end MAC OAMP Control sublayer updates MAC OAMP state hardware registers to reflect receipt of the OAMP information. The MAC OAMP hardware provides maskable interrupts for MAC OAMP Control Frames received. The near end MAC OAMP Control sublayer generates interrupts to invoke the OAMP Client. The OAMP Client processes the OAMP information. The OAMP information can include at least one of an alarm indicator, remote defect indicator, loopback request, performance monitoring parameters, switchover request, or various other OAMP operations information. The method can execute within 50 ms to provide recovery functionality. The MAC OAMP Control sublayer can also respond to the received OAMP control frames.

In accordance with another aspect of the present invention, a method of providing OAMP functionality on a MAC hardware device includes a near end MAC OAMP Control sublayer receiving OAMP Client requests to be transmitted. The MAC OAMP Control sublayer creates an OAMP Control frame with requested control parameters. The near end MAC OAMP Control sublayer transmits the MAC OAMP Control frame. The OAMP Client requests can include at least one of an OAMP request and an OAMP management request using OAMP signaling protocol. The OAMP Client requests can also include at least one of an alarm indicator, remote defect indicator, loopback request, performance monitoring parameters, switchover request, or various other OAMP operations information. The method can execute within 50 ms to provide recovery functionality. The MAC OAMP Control sublayer can also transmit or pass through the OAMP control frames.

In accordance with another aspect of the present invention, a method of providing OAMP functionality on an Ethernet protocol network includes experiencing a failure along a first port/link. An interrupt is generated. The interrupt is forwarded to an MAC OAMP Client. The MAC OAMP Client or the MAC OAMP Control sublayer can initiate a switch from the first port/link to a second port/link. The method can execute within 50 ms to provide recovery functionality.

In accordance with another aspect of the present invention, a method of providing OAMP Alarm Indication Signals (AIS) for downstream network equipment via OAMP control frames. Based on the layer at which the event is detected the appropriate OAMP wave, physical, section, line, and/or path control frame is generated.

In accordance with another aspect of the present invention, a method of providing OAMP Remote Defect Indication (RDI) signals for upstream network equipment via OAMP control frames is provided. Based on the layer at which the event is detected the appropriate OAMP wave, physical, section, line, and/or path control frame is generated.

In accordance with another aspect of the present invention, a method of providing OAMP Loopback requests for via OAMP control frames is provided.

In accordance with another aspect of the present invention, a method of providing OAMP Performance Monitoring information OAMP control frames is provided.

BRIEF DESCRIPTION OF THE DRAWINGS

The aforementioned features and advantages, and other features and aspects of the present invention, will become better understood with regard to the following description and accompanying drawings, wherein:

FIGS. 2A and 2B are diagrammatic illustrations of conventional SONET and SDH Frame structures;

FIGS. 6A, 6B, 6C, 6D, 6E, 6F, 6G, 6H, 6I, and 6J are a diagrammatic illustrations of Ethernet MAC OAMP Control Frame formats according to one aspect of the present invention.

DETAILED DESCRIPTION

Figure 1A:
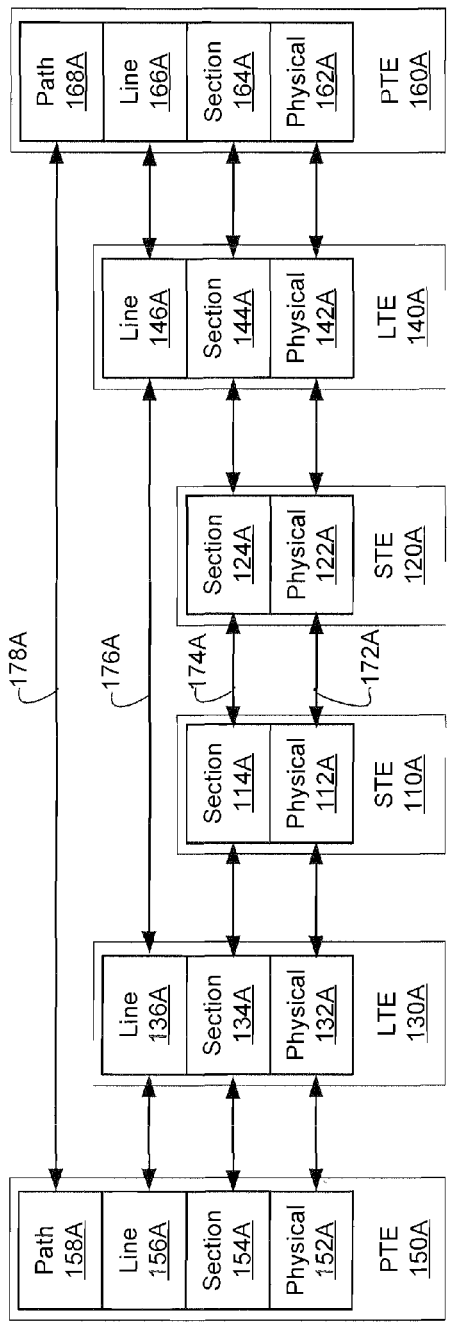
FIGS. 1A and 1B are diagrammatic illustrations of conventional SONET and SDH architecture layers.

Illustrative embodiments of the present invention relate to the implementation of standard SDH/SONET OAM/OAMP functionality within an Ethernet architecture. In order to support SDH/SONET OAMP functionality in the Ethernet architecture, the present invention extends the Ethernet MAC Control Sublayer. The Ethernet MAC Control sublayer is a sublayer of the data link layer (Layer 2, described later herein). The MAC Control sublayer resides between the MAC (the Media Access Control, which is an entity or algorithm utilized in negotiating access to a shared or dedicated communications channel) and a client of that MAC (where the client is typically a network layer protocol or a relay function implemented by bridges or switches). The clients of the MAC can use the MAC Control sublayer to control the operation of the Ethernet MAC. The implementation of MAC Control sublayer is optional under Ethernet standards. The present invention can also support additional OAMP functionality not defined by SDH/SONET standards, such as, Service Level Management (SLA), and the like.

Aspects of the present invention include an Ethernet MAC OAMP Control Protocol, which can be used to support Ethernet MAC OAMP. The Ethernet MAC OAMP Control Protocol extends the MAC Control sublayer to make use of Ethernet MAC multicast or unicast addresses, and MAC Control opcodes to support the OAMP function. The MAC OAMP function implements SDH/SONET OAMP on full duplex Ethernet links. The MAC OAMP functionality can also be extended appropriately for shared Ethernet links. The MAC OAMP frames contain the overhead bytes/octets as described by the SDH/SONET OAMP standards. The MAC OAMP also operates in a same manner to the known SDH/SONET OAMP. An OAMP Client can be the client for the Ethernet MAC OAMP Control sublayer. The OAMP Client uses the Ethernet MAC OAMP infrastructure provided in accordance with aspects of the present invention to implement standard OAMP functionality.

FIGS. 3 through 9, wherein like parts are designated by like reference numerals throughout, illustrate example embodiments of methods for implementing SDH/SONET OAMP in an Ethernet environment, according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

In order to appreciate operation of the illustrative embodiments described herein, it is helpful to understand the Open Systems Interconnect (OSI) network hierarchy, which views a network as being composed of several hierarchical layers. In the hierarchy, Layer 1 is the physical layer containing elements that perform the transmission of signals within the network. Layer 2 is the data link layer, which provides services that allow direct communication between devices across the underlying physical channel of Layer 1. Layer 3 is the network layer, which is responsible for station-to-station data delivery over multiple data links. The network layer is responsible for the routing of packets across the network. Layer 4 is the transport layer, which provides an error-free, sequenced, guaranteed delivery, message service that allows process to process communication between stations on a network. Layer 5 is the session layer, which deals with the establishment of communications between applications. This layer is useful for security applications. Layer 6 is the presentation layer, which enables the sharing of data between networked systems using different methods of local data representation. Finally, Layer 7 is the application layer. This layer provides generic application functions, such as email, file transfer capability, and the like.

In SDH/SONET, OAMP provides the architecture for administration, configuration issues, performance statistics, network management, customer support, trouble tracking, performance evaluation, configuration management, technical support, and billing.

Figure 1B:
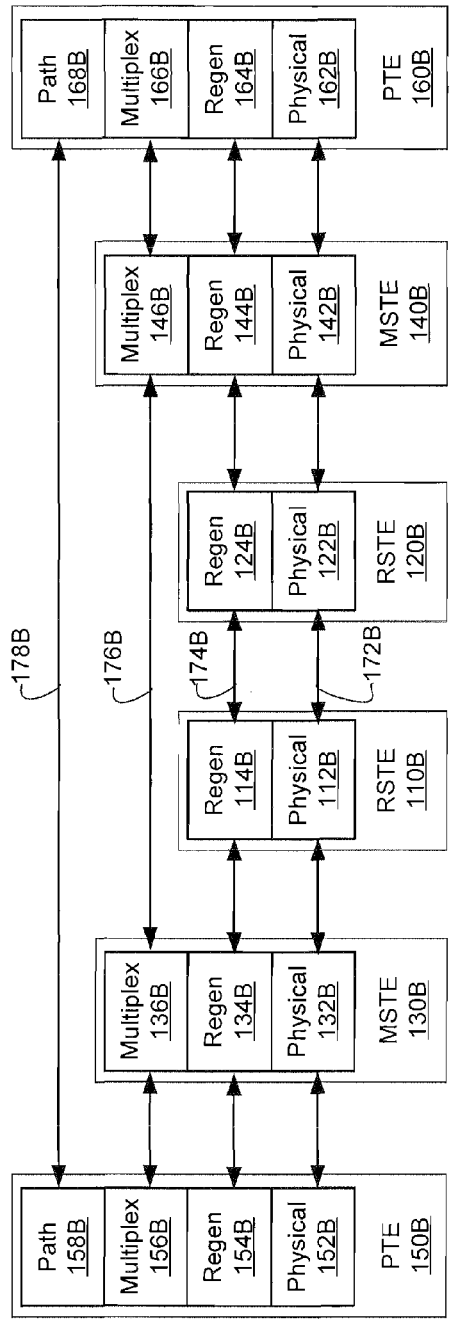

FIGS. 1A and 1B illustrate the conventional SONET and SDH architecture layers. The SONET architecture consists of four layers as shown in FIG. 1A. These layers are a different abstraction than the layers described in the OSI-RM networking hierarchy.

A Physical Layer 112A, 122A, 132A, 142A, 152A, and 162A deals with the transport of bits across a physical medium 172A. No overhead is associated with this layer. The main function of this is to convert electrical (STS) frames into optical (OC) bit signals.

A Section Layer 114A, 124A, 134A, 144A, 154A, and 164A is the regenerator section of the transmission link. Due to signal loss the bits transmitted must be regenerated at fairly regular intervals. The signal does not terminate at this point. Every segment 174A between a regenerator 110A and 120A, forms a section in the SONET network. The Section Layer 114A, 124A, 134A, 144A, 154A, and 164A manages the transport of STS frames across the Physical Layer 112A, 122A, 132A, 142A, 152A, and 162A. The functions of this layer include section error monitoring, framing, signal scrambling and transport of section layer overhead. The Section Overhead (SOH) is interpreted and monitored or created by Section Terminating Equipment (STE) 110A, and 120A.

A Line Layer 136A, 146A, 156A, and 166A manages the transport of entire SONET payloads, which are embedded in a sequence of STS frames, across the physical medium 172A. Two SONET Network Equipment (NE) 130A, and 140A are connected by a single SONET span 176A or link including lower layer regenerators. A Line Layer 136A, 146A, 156A, and 166A includes functions of multiplexing and synchronization, both required for creating and monitoring SONET payloads. The Line Overhead (LOH) is used to provide maintenance and protection features. The LOH is interpreted and modified or created by Line Terminating Equipment (LTE) 130A and 140A.

A Path Layer 158A and 168A deals with end-to-end path 178A transmission of various payloads between SONET terminal multiplexing equipment 150A and 160A. The Path Layer 158A and 168A communicates end-to-end via the Path Overhead (POH). The POH is interpreted and modified or created by Path Terminating Equipment (PTE) 150A and 160A.

All layers communicate horizontally to peer equipment in the same layer. Each layer processes certain information and passes it vertically to an adjacent layer. Access to all layers is not required in every SONET NE. A SONET NE may monitor overhead of layers that they do not terminate.

SDH Architecture consists of four layers as shown in FIG. 1B. The SDH layers are similar to SONET layers as described above but use different terminology. A Physical Layer 112B, 122B, 132B, 142B, 152B, and 162B is similar to the SONET Physical Layer. A Regenerator Section Layer 114B, 124B, 134B, 144B, 154B, and 164B is similar to the SONET Section Layer. A Multiplex Section Layer 136B, 146B, 156B, and 166B is similar to the SONET Line Layer. A Path Layer 158B and 168B is similar to the SONET Path Layer. A physical medium 172B connects physical layers. A regenerator section 174B or span forms a logical connection between regenerator section layers. A multiplex section 176B or line forms a logical connection between multiplex section layers. A path 178B forms a logical connection between path layers.

SDH/SONET overheard bytes/octets at the path, section, and line levels are used for OAMP procedures. Several bytes are constantly monitored by receiving SDH/SONET equipment for fault detection and others are used to correct and compensate for these errors.

FIGS. 2A and 2B illustrate the conventional SONET and SDH Frame structure and the associated overhead bytes. FIG. 2A shows a SONET frame 200A consists of a Section Overhead (SOH) 202A, a Line Overhead (LOH) 204A, a STS-1 Payload Envelope (SPE) 208A, which includes the Path Overhead (POH) 206A. FIG. 2B shows the SDH frame 200B consists of a Regenerator Section Overheard (RSOH) 202B, a Multiplex Section Overhead (MSOH) 204B, and a STM-1 Payload 208B, which includes a Path Overhead (POH) 206B and a AU-n Pointer 210B.

SDH/SONET standards specify the format and the bytes of the frame and the overhead. The Section Overhead (SOH) bytes directly related to OAMP are a A1/A2 framing bytes, the D1, D2, and D3 Direct Communication Channel (DCC) bytes, and a H1/H2 pointer bytes (AU-n Pointer bytes in SDH).

The Line Overhead (LOH) bytes directly related to OAMP are the K1|K2 automatic protection switching (APS) bytes, the D4 through D12 DCC bytes, the S1 synchronization bytes, and the M0/M1/Z2/REI-L byte.

The Path Overhead (POH) bytes directly related to OAMP are the C2 signal path byte and the G2 path status byte.

There are similar monitoring features and alarm conditions built into Virtual Tributaries (VT) level SONET path and Administrative Unit (AU), Tributary Unit (TU), Virtual Container (VC) and Container (C) SDH path levels. These can also be supported in the present invention similar to the SONET STS-1 or SDH STM-1 overhead bytes.

The present invention can support SDH/SONET OAMP functionality in the Ethernet environment. However, for clarity in describing the invention, the description contained herein utilizes SONET terminology, rather than SDH terminology, to describe the network and implement the OAMP functionality. One of ordinary skill in the art will appreciate that SDH functionality and terminology falls within the scope of the present invention to implement the OAMP functionality.

Figure 3:
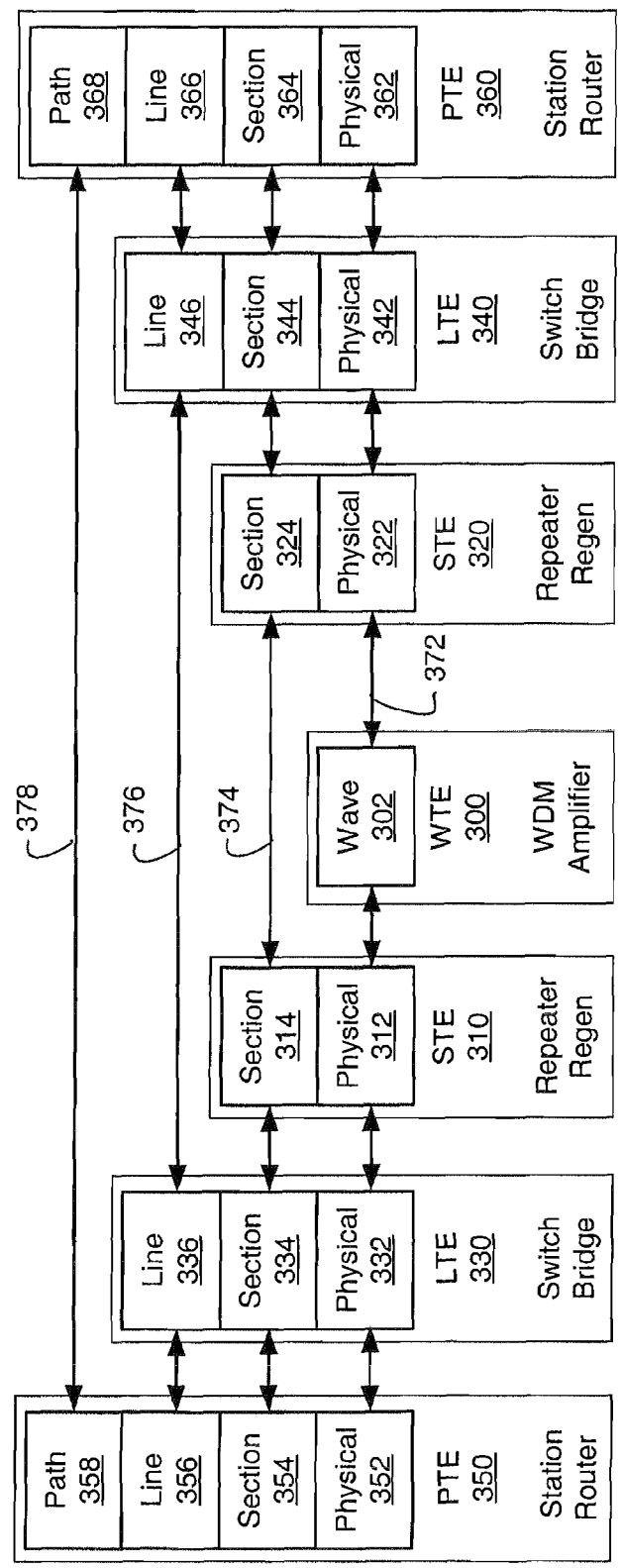
FIG. 3 is a diagrammatic illustration of Ethernet architecture layers according to one embodiment of the present invention.

FIG. 3 illustrates an Ethernet architecture layers as defined by the present invention. The Ethernet Architecture consists of five layers. These layers are a different abstraction from the layers described in the OSI-RM networking hierarchy.

In the Ethernet environment, a Physical Layer 312, 322, 332, 342, 352, and 362 or PHY protocol defines the electrical signaling symbols, line states, clocking requirements, encoding of data, and connectors for data transmission across a physical medium 372. Repeaters or regenerators 310, and 320 are OSI layer 1 devices in that they only retransmit signals without decoding them. Thus, a repeater in conventional Ethernet standards has no MAC, and the data is only handled by PHY on the receiving and transmitting ports. Sublayers within the PHY are capable of detecting faults that render a link unreliable for communication. The PHY can signal the MAC about local or remote link failures. The link failure can be used to declare Signal Failure (SF). Frame Check Sequence (FCS) errors are also indicated by the PHY to the MAC. These conditions can be used to declare Signal Degrade (SD) condition. Ethernet Link Failure (LF) condition is equivalent to the SDH/SONET Loss of Signal (LOS) condition. Ethernet FCS errors are equivalent to SDH/SONET BIP-8 (B2) errors.

Ethernet Repeaters typically are used to connect multiple segments into a larger segment and is a shared media. An Ethernet Regenerator is defined as Ethernet Repeater which only connects one Ethernet segment to another. Ethernet Regenerators typically will be used to extend the range of a network and is not a shared media.

A Section Layer 314, 324, 334, 344, 354, and 364 is the repeater section of the transmission link. Due to signal loss, the bits transmitted must be repeated or regenerated at fairly regular intervals. The signal does not terminate at this point. Every segment 374 between regenerators 310 and 320 forms a section in the Ethernet network. The Section Layer 314, 324, 334, 344, 354, and 364 manages the transport of Section level OAMP Control frames across the Physical Layer 312, 322, 332, 342, 352, and 362. The function of this layer includes section error monitoring, section level OAMP framing, and transport of section layer overhead. The section level OAMP Control frames contain section overhead bytes. The Section Overhead (SOH) is interpreted and monitored or created by Section Terminating Equipment (STE) 310 and 320.

A Line Layer 336, 346, 356, and 366 manages the transport of Line level OAMP Control frames across the physical medium 372. Two Ethernet Network Equipment (NE) 330 and 340 are connected by a single Ethernet span 376 or link including lower layer repeaters or regenerators. The Line Layer 336, 346, 356, and 366 functions include creating and monitoring line level OAMP Control frames. The line level OAMP Control frames contain line overhead bytes. The Line Overhead (LOH) is used to provide maintenance and protection features. The LOH is interpreted and modified or created by Line Terminating Equipment (LTE) 330, and 340.

A Path Layer 358 and 368 deals with end-to-end path 378 transmission of various Path level OAMP Control frames between Ethernet switching equipment 350 and 360. The path level OAMP Control frames contain path overhead bytes. The Path Layer 358 and 368 communicates end-to-end via the Path Overhead (POH). The POH is interpreted and modified or created by Path Terminating Equipment (PTE) 350, and 360.

Most current networks also have Wave Division Multiplex (WDM) equipment which can multiplex and transparently transport several physical layer connections over a single physical medium 372 using different wavelengths. In the present invention, the Wave Layer 302 manages the wave level OAMP Control frames, including creating and monitoring wave level OAMP Control frames. The wave level OAMP Control frames contain wave overhead bytes. The Wave Overhead (WOH) is used to provide maintenance and protection features for waves. The WOH is interpreted and modified or created by Wave Terminating Equipment (WTE) 300. Currently, there is no standard for Wave Layer. If Wave Layer becomes integrated into the STE, LTE, and PTE NE then the Wave Layer would also be processed in those NE and would architecturally be shown as a layer below the Physical Layers in those NE.

In order to take support OAMP, Ethernet Repeaters, Regenerators, and WDM equipment would need to use Ethernet MAC with the appropriate OAMP level support. Full-Duplex Repeaters have a rudimentary MAC function. Similarly, regular Ethernet Repeaters, Regenerators, and WDM equipment can use rudimentary MAC function to monitor and support OAMP functions.

All layers communicate horizontally to peer equipment in that layer, process certain information, and pass the information vertically to the adjacent layer. Access to all layers is not required in every Ethernet NE. NE may monitor overhead of layers that they do not terminate.

The present invention can support wave, physical, section, line, and path level OAMP functions. The present invention can support OAMP functions for ring and mesh topology. Path level OAMP support can also be supported by the architecture of the present invention by providing the appropriate source and destination Ethernet MAC addresses.

Figure 4:
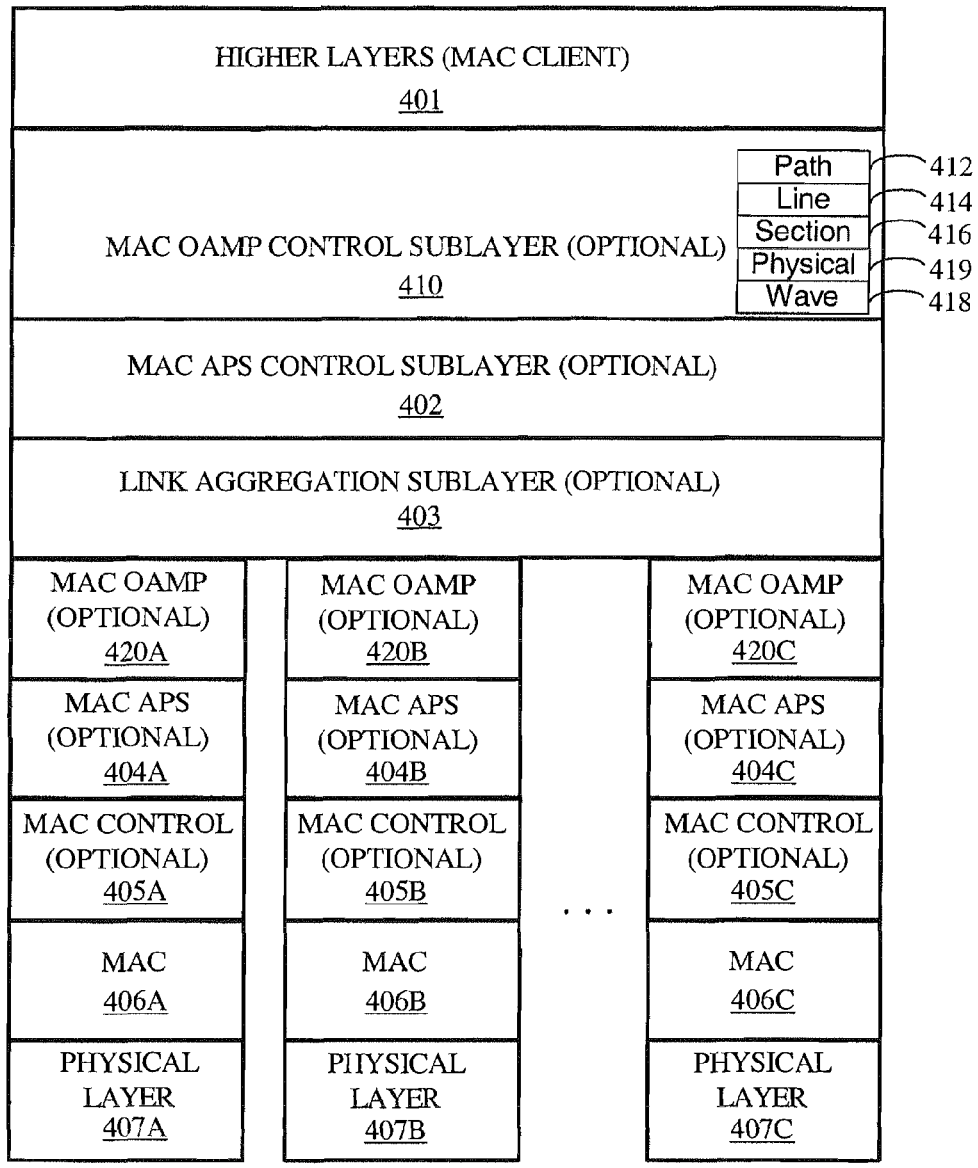
FIG. 4 is a diagrammatic illustration of an Ethernet MAC OAMP Control architecture according to one embodiment of the present invention.

FIG. 4 shows an Ethernet MAC OAMP Control Architecture. The MAC Client (or Higher Layers) 401 can be, e.g., a network layer protocol, such as IP, or a forwarding function for switches. In the illustrated embodiment, the MAC Client 401 also implements the OAMP Client functionality. The OAMP Client in the MAC Client 401 manages the state of the OAMP and reacts to various errors, OAMP events or commands. The MAC Client 401 maintains the performance statistics and monitoring. The MAC Client 401 can also provide support for various other operations functions. The MAC OAMP Client can be implemented in software and/or hardware layers.

A MAC OAMP Control sublayer 410 supports OAMP functions for logical links formed by a Link Aggregation sublayer 403. A MAC APS Control sublayer 402 supports APS for logical links formed by the Link Aggregation sublayer 403. The Link Aggregation sublayer 403 allows a plurality of physical links to be aggregated into one aggregated link. An aggregated link is one form of a logical link. The MAC OAMP Control sublayers 420A, 420B, and 420C support OAMP for physical links. In addition, MAC APS Control sublayers 404A, 404B, and 404C support APS for physical links. Standard MAC Control sublayers 405A, 405B, and 405C, support all the currently defined MAC control frames, e.g., PAUSE frames, which prevent switches from unnecessarily discarding data frames due to input buffer overload. All MAC OAMP Control sublayers 410, 420A, 420B, and 420C are optional. All MAC APS Control sublayers 402, 404A, 404B, and 404C are optional. All of the MAC Control sublayers 405A, 405B, and 405C are optional. A standard MAC sublayer 406A, 406B, and 406C, controls access to media. A standard PHY sublayer 407A, 407B, and 407C, implements physical layer signals for transmission media.

Based on the context (WTE, STE, LTE, PTE) of the Ethernet NE the MAC OAMP Control sublayer 410, 420A, 420B, and 420C can create, modify, and monitor a corresponding wave 418, physical 419, section 416, line 414, and path 412 MAC OAMP Control frames, or the corresponding information in the control frames.

For Ethernet MAC OAMP wave, physical, section, line, path OAMP and several other OAMP features, Ethernet MAC OAMP requires the support of creating, modifying and monitoring of overhead bytes. The overhead bytes are used to signal between NE and Ethernet MAC OAMP layers. The OAMP signals can be used for fault isolation and take corrective actions.

The MAC Control Sublayer extends to provide OAMP functionality by enabling Ethernet to support SDH/SONET OAMP signaling protocol. The MAC Control sublayer also extends to provide optional support of VLAN tags for MAC control frames. Aspects of the present invention introduce the Ethernet MAC OAMP Control sublayers 410, 420A, 420B, and 420C, as shown in FIG. 4. The Ethernet MAC OAMP Control sublayers 410, 420A, 420B, and 420C, include an Ethernet MAC OAMP Control Frames, which contains the overhead bytes in accordance with definitions of the overhead bytes in the known SDH/SONET standards. The bytes can be transmitted exactly as defined by SDH/SONET standards or defined to be more convenient for Ethernet OAMP requirements. The MAC OAMP Control sublayer 410 can support MAC OAMP at the Link Aggregation sublayer 403 (logical network interface layer) and/or physical network interface layer 404A, 404B, and 404C. It should be noted that the same physical hardware can be used to process the OAMP signaling protocol for the MAC OAMP sublayer 410, 420A, 420B, and 420C. It should be noted that the same physical hardware can also be used to process the APS signaling protocol for the MAC APS sublayer 402, 404A, 404B, and 403C. All these can be implemented together with the MAC Control sublayer physical hardware.

The MAC OAMP Control sublayer 410, 420A, 420B, and 420C also provide support for various other operations functions such as Automatic Protection Switching, Loopback, Performance Monitoring, Trace signal, Sync signal, and Bit Error Rate Tests (BERT), Data Communication Channel (DCC), Orderwire (OW), and the like. The MAC OAMP Control sublayer can also support additional OAMP functionality not defined by SDH/SONET standards, such as, Service Level Management (SLA), and the like.

Some OAMP in Ethernet can be implemented at the physical layer (Layer 1) like SDH/SONET in the framing process by modifying the framing or using interframe gaps for OAMP signaling protocol, or it can be implemented in the Ethernet MAC Control sublayer like the PAUSE function or Link Aggregation function known in the art. With OAMP in physical layer only line OAMP functionality can be supported. Modifying Ethernet framing to implement OAMP would not be backward compatible and would be difficult to standardize through the end users and industry. Also, modifying Ethernet framing would be only a partial solution because Ethernet frames are only transmitted when there is data to be sent. If there is no data to be sent, there is no Ethernet frame to carry OAMP signals. Contrarily, in SDH/SONET, frames are continuously generated (data or idle). Therefore, implementing OAMP at the Ethernet MAC Control sublayer allows the OAMP signaling to be event and packet driven in a natural Ethernet manner.

Figure 5:
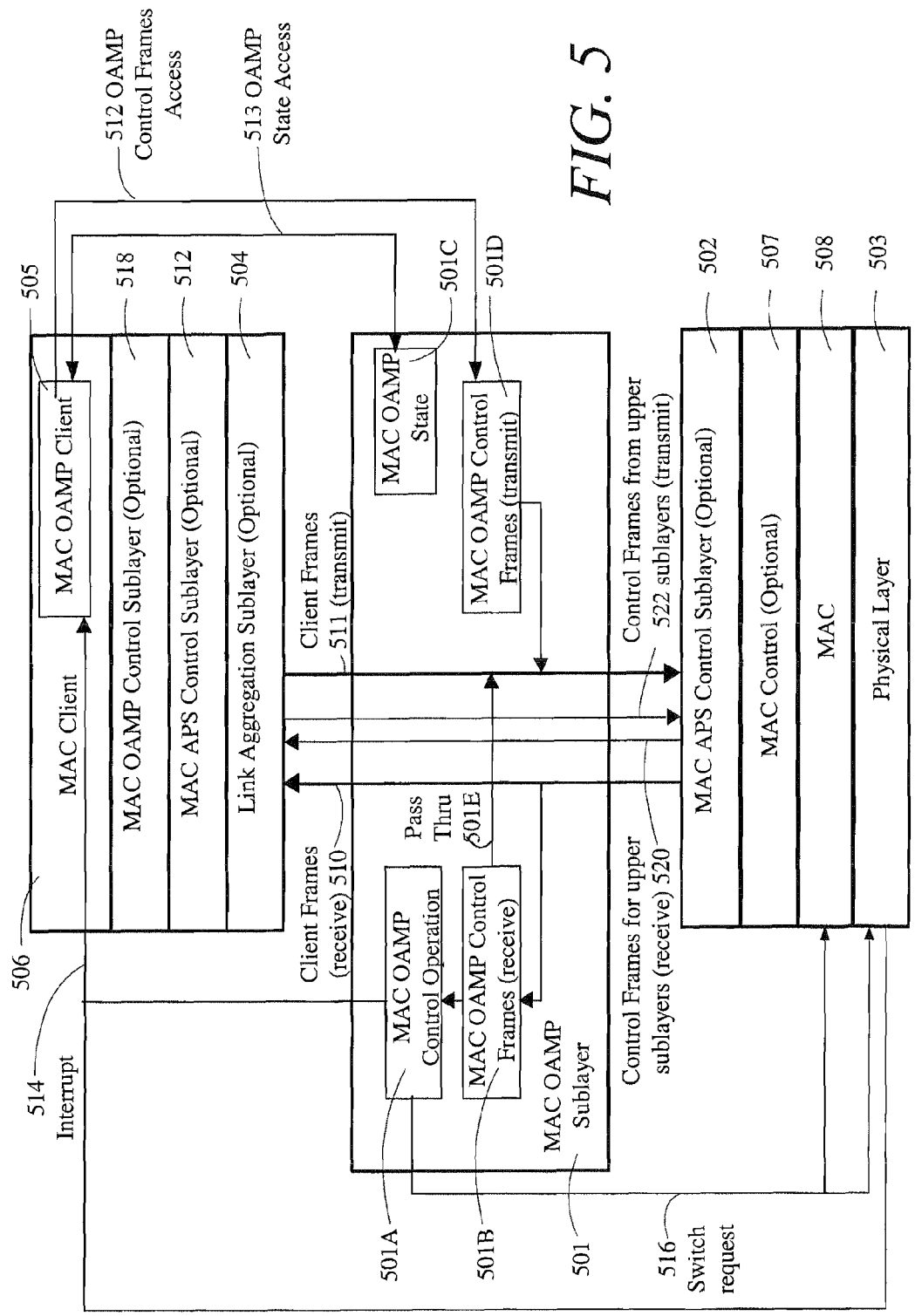
FIG. 5 is a diagrammatic illustration of an Ethernet MAC OAMP Control sublayer internal architecture according to one aspect of the present invention.

FIG. 5 shows the Ethernet MAC OAMP Control sublayer internal architecture. Again, a MAC Client (or Higher Layers) 506 can be a network layer protocol, such as IP, or a forwarding function for switches. In the illustrated embodiment, the MAC client 506 again implements MAC OAMP Client OAMP functionality. A MAC OAMP Client 505 manages the state of the OAMP and reacts to various errors, OAMP events or commands. The MAC OAMP Client 505 maintains the performance statistics and monitoring. The MAC OAMP Client 505 can also provide support for various other operations functions such as loopback, path signal, sync signal, and Bit Error Rate Tests (BERT), DCC, Orderwire (OW) etc. The MAC OAMP Client 505 can be implemented in software or hardware layers.

A MAC OAMP Control sublayer 518 supports OAMP for logical links formed by a Link Aggregation sublayer 504. A MAC APS Control sublayer 512 supports APS for logical links formed by a Link Aggregation sublayer 504. The Link Aggregation sublayer 504 allows many physical links to be aggregated into one logical link. MAC OAMP Control sublayer 501 supports OAMP for physical links. MAC APS Control sublayer 502 supports APS for physical links. Standard MAC Control sublayers 507 support all of the currently defined MAC control frames, e.g., PAUSE frames. All the MAC Control sublayers are optional. A standard MAC sublayer 508 controls access to the media. A standard PHY sublayer 503 implements physical layer signals for transmission media.

Based on context (WTE, STE, LTE, PTE) of the Ethernet NE the MAC OAMP Control sublayer 501 and 518 can create, modify, and monitor the corresponding wave, physical, section, line, and path MAC OAMP Control Frames or the corresponding information in the control frames.

The MAC OAMP Control sublayer 501 includes a MAC OAMP Control operation 501A, which manages a MAC OAMP state 501C based on MAC OAMP Control frames received from MAC OAMP Control Frame buffers 501B. The MAC OAMP Control operation 501A also generates an interrupt along line 514 when there is a change in OAMP bytes state. The MAC OAMP Client 505 can access the MAC OAMP State 501C. The MAC OAMP State 501C contains various interrupt status registers, OAMP byte state registers, OAMP opcode received, and other OAMP related information. The MAC OAMP Client 505 can also transmit MAC OAMP Control Frames from MAC OAMP Control Frame buffers 501D and built by the MAC OAMP Client 505 by setting up registers 513 in the MAC OAMP State 501C. The MAC OAMP Control sublayer 501 can also support MAC OAMP Client 505 directly 512 providing the MAC OAMP Control frames for transmit 501D.

As shown in FIG. 5, the Ethernet MAC Architecture is modified to support MAC OAMP Control sublayers 501 and 518. The Ethernet MAC architecture supports OAMP processing in the MAC OAMP Control Operation 501A of MAC OAMP Control Frame buffers 501B and 501D, maintains MAC OAMP State 501C, and generates interrupts along interrupt line 514 when a MAC OAMP Control Frame has been received and/or if there has been a change in OAMP state at the MAC OAMP State 501C. The MAC OAMP Control frames 501B received can be transmitted back directly 501E or via the transmit frame buffer 501D when the MAC OAMP Control sublayer 501 is in continue through modes as defined by SDH/SONET for full pass through or K1/K2 pass through. The MAC OAMP Operation 501A can also provide a signal 516 to indicate to a MAC sublayer 508 or Physical Layer 503 or some other APS switching device to switch over from working to protect or protect to working interfaces due detection of a failure or OAMP alarm. OAMP Control frames not meant for the MAC OAMP Control sublayer 501 can pass through for upper sublayers 520 and OAMP Control frames from upper layers 522 can pass though to lower sublayers. In case of both MAC APS and MAC OAMP functionality being supported, when control frames need to be transmitted, the MAC APS frames are given precedence because of the 50 ms switchover requirements of SDH/SONET APS. In the receive path, MAC APS control frames should also be given priority.

The Ethernet hardware supports interrupts from Physical Layer 503 from hard failures due port failures or link failures. Similarly, the Ethernet hardware can be extended to support soft failures, such as error rates greater than predetermined configured thresholds. The Ethernet hardware provides additional registers at the MAC OAMP State 501C for higher Layers and the MAC OAMP Client 505 to access, via the access line 513, the current state of OAMP, such as overhead bytes, and the like.

Dedicated MAC OAMP Control Frame buffers 501B and 501D receive and transmit, respectively, the MAC OAMP Control Frames. The existence of the MAC OAMP Control Frame buffers 501B and 501D prevents head of queue blocking of the control frame so that OAMP actions can be taken quickly in accordance with the SDH/SONET standard. This includes support of switchover within 50 ms for protection. The Ethernet hardware can additionally provide separate control and maskable status registers for OAMP functionality in the MAC OAMP State 501C. The MAC OAMP Control Frames (transmit) from the MAC OAMP Control Frame buffer 501D can be accessed by the MAC OAMP Client 505 using hardware path 512. The access can be implemented as registers or via direct access to the MAC OAMP Control Frame buffer 501D. The received data frames directly pass along the Client Frames receive path 510 to the MAC client 506. The MAC Client 506 transmit data frames path 511 transmits the MAC Client 506 data frames directly the MAC hardware.

The MAC OAMP Control sublayer 501 as shown in FIG. 5 can be placed below the Link Aggregation sublayer 504 to manage individual physical links of the MAC APS Control sublayer 502. Alternatively, the MAC OAMP Control sublayer 518 can be positioned above the Link Aggregation sublayer 504 to protect logical links. The same architecture supports both cases. Different MAC Control opcodes are utilized to distinguish between each of the different cases. An alternative embodiment the MAC OAMP Control sublayers 501, and 518 can be below the MAC APS Control sublayers 502, and 512.

When a defect or failure is detected locally on a near end node (the node closer to the source of the transmission) the Ethernet PHY layer 503 generates an interrupt along interrupt line 514, which invokes the MAC OAMP Client 505 and in turn causes an OAMP action. The Physical Layer 503 can also signal the MAC sublayers 508 using the interface between them. The MAC OAMP Control sublayer can react to the failure detected and respond with appropriate OAMP action. The OAMP action can be to send alarm signals up and down streams and/or to switchover 516 within about 50 ms in case of MAC OAMP configuration.

When a defect or failure is detected remotely by a far end node (a node closer to the destination of the transmission), it sends a MAC OAMP Control Frame from the MAC OAMP Control Frame buffer 501D with the appropriate OAMP indicator/status and information as needed by the OAMP bytes. When the MAC OAMP Control Frame is received at the near end node, the near end MAC OAMP Control sublayer 501, 501A processes the MAC OAMP Control Frame from the MAC OAMP Control Frame buffer 501B and updates the MAC OAMP hardware state/registers at the MAC OAMP State 501C to reflect the new request. The hardware provides maskable interrupts for MAC OAMP Control Frames received and if there is change in MAC OAMP State bytes at the MAC OAMP State 501C. When such an interrupt occurs it again invokes the MAC OAMP Client 505, which executes the OAMP action.

The MAC Control Operation 510A can also monitor for MAC OAMP Control frames, such as AIS-P, PDI-P, and the like, used for switching criteria as defined by the SDH/SO- NET standards. When such a MAC OAMP Control Frame is received the MAC OAMP Control Operation 510A can directly signal the Ethernet PHY layer 503 to switchover 516 within 50 ms from working to protect or vice versa. The MAC Control Operation 510A can also be configured to interrupt 514 the MAC OAMP Client 505 which in turn can request the switchover 516 within 50 ms via the MAC OAMP Control Operation 510A.

In the transmit direction, the hardware can be implemented such that there are OAMP registers at the MAC OAMP State 501C and when the OAMP Client 505 needs to transmit the MAC OAMP Control Frame it writes to the MAC OAMP Control Frame buffer 501D via the hardware path 512 of the control registers.

In an alternative embodiment, the MAC Client 505 can create the complete MAC OAMP Control frame to transmit in the MAC OAMP Control Frame buffer 501D.

In MAC OAMP Control Operation 501A pass through mode, the MAC OAMP Control frames received in the MAC OAMP Control Frame buffer 501B can be modified and transmitted, or retransmitted 501E, without being modified directly by the MAC OAMP Control Operation 501A, and without involving the MAC Client 505. Alternatively, the MAC Client 505 can be involved and it can recreate the pass through control frame in MAC OAMP control frame buffer 301D and transmit The MAC OAMP State 501C will also monitor and keep status of Performance Monitoring counters and status information.

The MAC OAMP Control sublayer 501 also provides support for various other operations functions such as Automatic Protection Switching (APS), Loopback, Trace signal, Sync signal, Performance Monitoring (PM), and Bit Error Ratio Tests (BERT), Data Communication Channel (DCC), Orderwire (OW), Service Level Agreement (SLA), and the like.

There are several embodiments for implementation of the present invention in the MAC layer. To distinguish which MAC OAMP context exists in any one instance, wave, physical, section, line, or path, logical versus physical, one of several processes below occurs. One implementation is to use the MAC Control Frames, multicast destination address 01-80-C2-00-00-04, type 0x8808 and four opcodes for Line Physical OAMP frames, Line Logical OAMP frames, Section OAMP frames and Path OAMP frames. This method can be used to support SDH/SONET transparency requirements over Ethernet. A second implementation in this method opcodes based on OAMP functional classification could be defined. For example, opcodes for Alarm Indication Signal (AIS), Remote Defect Indication (RDI), Automatic Port Switching (APS), Data Communication Channel (DCC), Trace, Sync, Loopback, Performance Monitoring (PM), Bit Error Ratio Test (BERT) etc., functions as described in SONET GR-253 Section 6.2 can be defined with corresponding opcode specific control parameters. A third implementation in this method is based on defining opcodes of critical events individually for performance or support requirements. For example, separate opcodes can be defined for declaring and clearing of AIS-L, AIS-P, RDI-L, RDI-P, APS, equipment failure, far end performance monitoring parameters etc. A fourth implementation in this method is a combination of the first three implementations. A fifth implementation makes use of the different frame types instead of opcodes. Alternatively, an embodiment can implement MAC OAMP as one class of Slow Protocols, as defined in the Ethernet Standards, a class of protocols wherein they never emit more than a specified maximum number of frames per time period. Still, another embodiment includes implementation using vendor specific, multicast destination addresses. One of ordinary skill in the art will appreciate that different combinations of the above embodiments, as well as others not specified, can also be used.

Figure 6A:
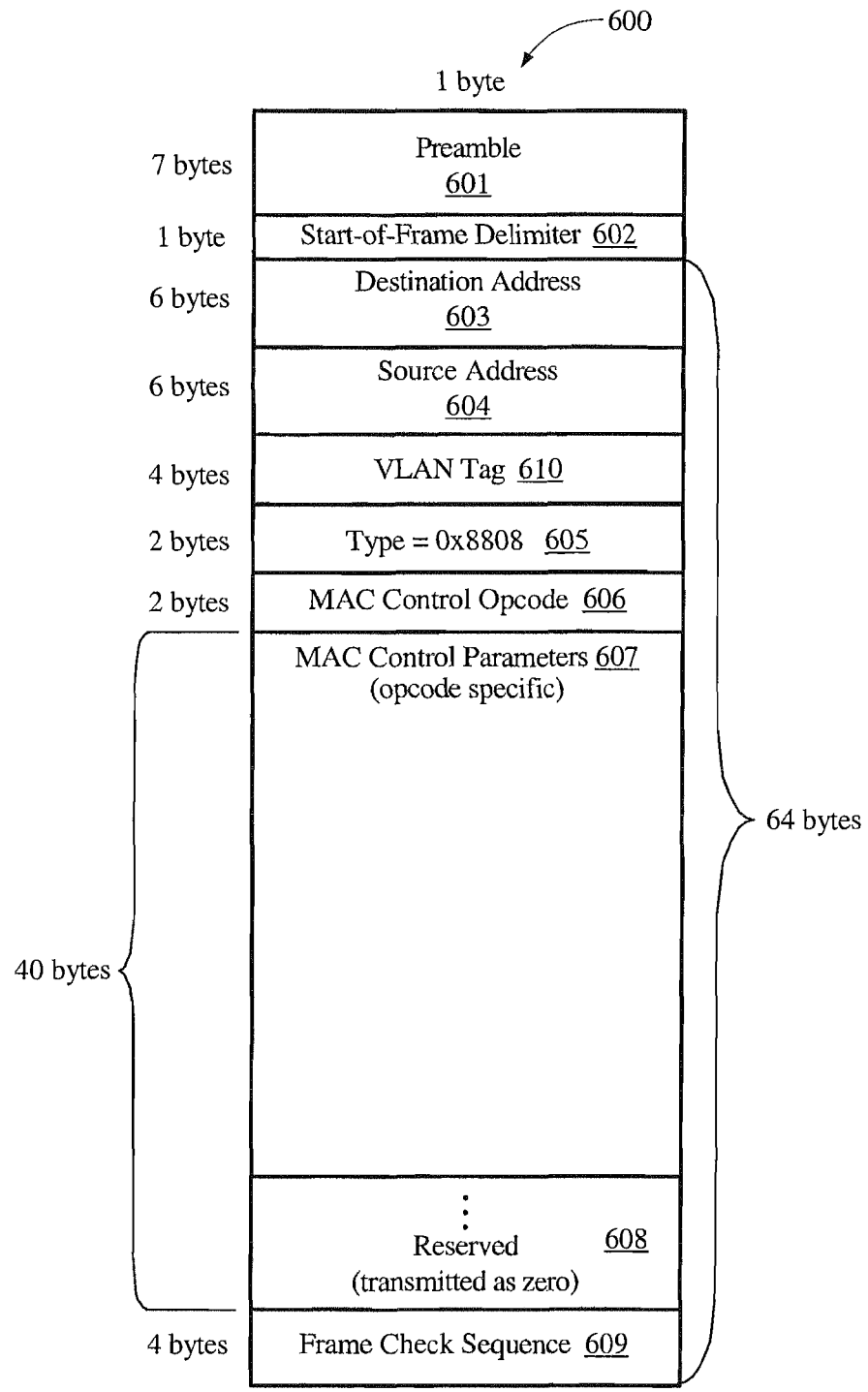

FIG. 6A shows an example Ethernet MAC OAMP Control Frame 600 format. All Ethernet frames start with seven bytes of Preamble 601, each containing the value 0x55. A Start of Frame Delimiter (SFD) 602 contains the value 0xD5. A destination address 603 contains the unique multicast address reserved for MAC OAMP operations: 01-80-C2-00-00-04. The destination address 603 can also be the unicast MAC address of the destination port or end station or network equipment (NE). The destination MAC can be configured through an external mechanism, such as the system software. One method for destination address is to use the multicast address for Wave, Physical, Regenerator/Section, and Multiplex/Line OAMP control frames and to use unicast addresses for Path OAMP control frames. The destination address 603 requires six bytes. A source address 604, also requiring six bytes, contains the unicast address of the source interface sending the MAC OAMP frame. A VLAN tag field 610 is optional and contains standard VLAN Protocol ID 0x8100 within the first two bytes of the field and the second two bytes contain the VLAN Identifier, priority, and Tag Control Info bit. These are defined by the 802.1Q/1p standards. A type field 605 contains the reserved value 0x8808 used for all MAC Control Frames, and requires two bytes. The MAC OAMP Control Opcode 606 can have different OAMP opcode types based on the different embodiments. The MAC OAMP Control Opcodes in 606 would require registering with the 802 Standards Committee. In all instances, the MAC OAMP Control Opcode 606 requires two bytes. The MAC OAMP Control Parameters field 607 is optional and can have different parameters based on different embodiments. These control parameter fields can contain values based on the corresponding overhead bytes of standard SDH/SONET OAMP. External software can use these fields to generate alarms or report the status of where the failure occurred. A Reserved field 608 is maintained for future extensions and is set to all zeros. A Frame Check Sequence (FCS) field 609 is a checksum computed on the contents of the frame from the Destination Address 603 through to the end of the Reserved field 608 inclusively.

To provide priority to the MAC OAMP control frame 600, the VLAN field 610 can be set up with appropriate priority. It should be noted that if the VLAN tag 610 is used for path level OAMP, then by definition, all the stations/nodes along the path need to be VLAN aware. Alternatively, the edge station/node can strip off the VLAN tag. Configuration must indicate that this is a VLAN edge station/node.

FIGS. 6B, 6C, 6D, 6E, 6F, 6G, 6H, 6I, and 6J illustrate the MAC OAMP Control Opcode 606, and Control Parameters 607 part of the MAC OAMP Control frames for various different embodiments.

Figures 6B, 6C:
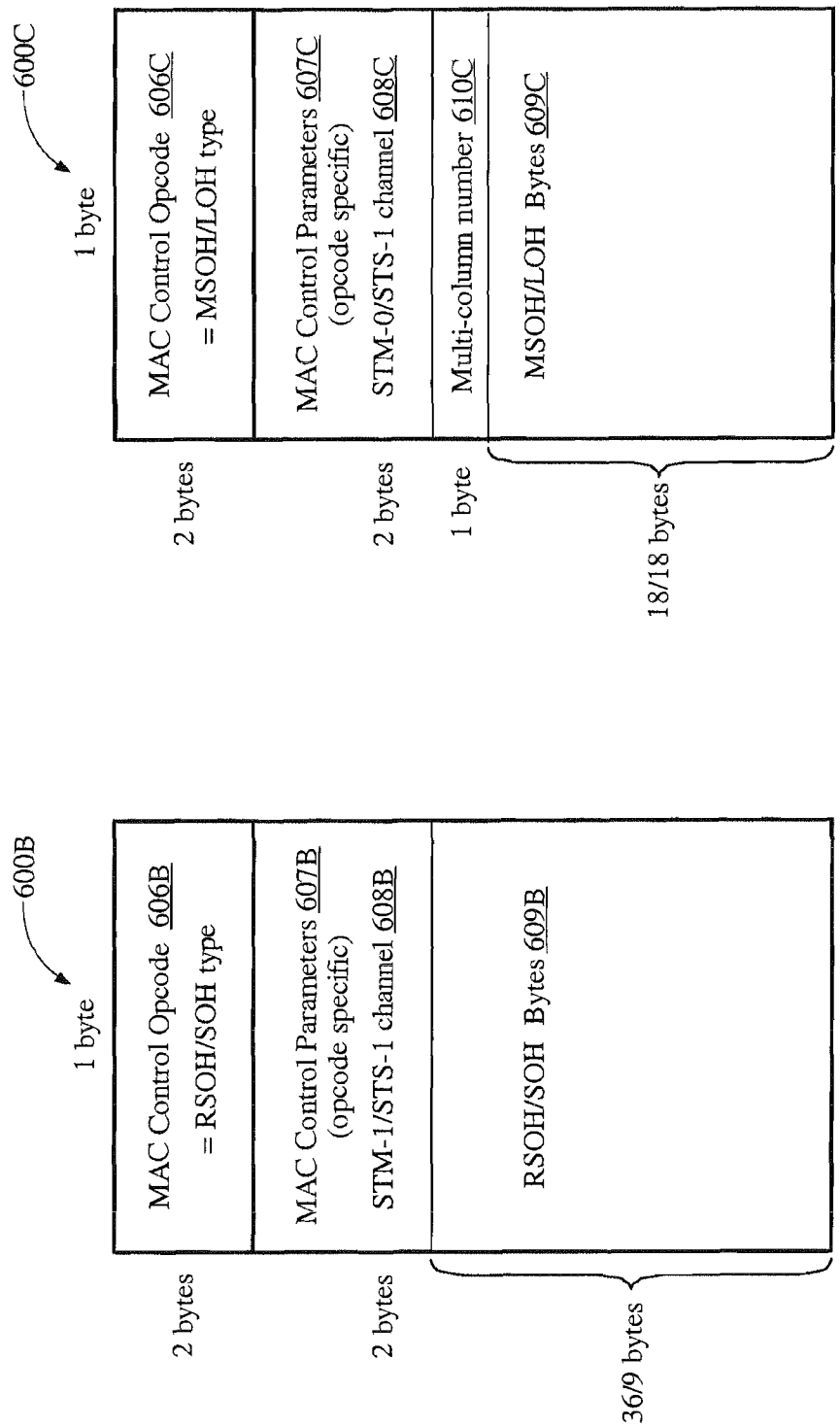

FIGS. 6B and 6C illustrate MAC OAMP Control Opcode and Parameters structure and the associated overhead bytes as defined by one embodiment of the present invention. In this embodiment the SDH/SONET overhead bytes can be transmitted in the MAC Control Parameters fields as is in complete by taking the SDH/SONET overheard bytes for Regenerator/Section, Multiplex/Line, and Path. This embodiment can be used in SDH/SONET transparency support type applications to transfer SDH/SONET overhead bytes over Ethernet network.

This embodiment can be used to as an alternative to sending overhead bytes using Ethernet Frame data field in user packets. The advantage is that the MAC layer can handle OAMP for speed and efficiency. Otherwise upper client layers have to be involved for every OAMP request/frame.

FIG. 6B illustrates an example of a RSOH/SOH OAMP control frame's 600B MAC OAMP Control Opcode field 606B and MAC OAMP Control Parameters field 607B. The MAC OAMP Control Opcode field 606B contains a value 0x0100 indicating that the control frame is of RSOH/SOH type. The MAC Control Parameters 607B has a 2 bytes STM-1/STS-1 channel parameter field 608B. This field specifies the SDH/SONET channel the overhead bytes are associated with. The MAC Control Parameter 607B has 36 bytes for SDH STM-1 RSOH or 9 bytes for SONET STS-1 SOH field 609B. This field contains the overhead byte values as contained in the SDH/SONET framing.

FIG. 6C illustrates an example of a MSOH/LOH OAMP control frame's 600C MAC OAMP Control Opcode field 606C and MAC OAMP Control Parameters field 607C. The MAC OAMP Control Opcode field 606C contains a value 0x0200 indicating that the control frame is of MSOH/LOH type. The MAC Control Parameters 607C has a 2 bytes STM-0/STS-1 channel parameter field 608C. This field specifies the SDH/SONET channel with which the overhead bytes are associated. MAC Control Parameter 607C has a 1 byte field for Multi-column number field 610C of the associated STM-0 overhead bytes. The Multi-column number is defined by standard G.701/Y.1322 section 9.2.1. The MAC Control Parameter 607C has 18 bytes for SDH STM-0 MSOH or 18 bytes for SONET STS-1 SOH field 609C. This field contains the overhead byte values as contained in the SDH/SONET framing. SDH MSOH bytes are transmitted in STM-0 overhead columns because STM-1 overhead bytes along with the rest of the control frame bytes make the total control frame size larger than 64 bytes which is the current frame length size restriction for control frames.

The POH control frame can similarly be defined. Alternatively, in SDH/SONET the POH is typically associated with the payload in can be transparently transmitted along with the SDH/SONET payload.

FIGS. 6D, 6E and 6F illustrate an embodiment of control frames based on functionality. In this embodiment control frame opcodes are defined for functional categories such as Alarm Indication Signal (AIS), Remote Defect Indication (RDI), Loopback, Automatic Port Switching (APS), Data Communication Channel (DCC), Trace Bytes, Synchronization bytes, Performance Monitoring (PM) and Bit Error Ratio Test (BERT). The control frame control parameters can have fields and values for the corresponding SDH/SONET Regenerator/Section, Multiplex/Line and Path functional bytes. Each NE will process the bytes that it terminates. The values of the fields can be defined same as those indicated in the corresponding SDH/SONET overhead bytes.

FIG. 6D illustrates an example of a MAC OAMP AIS control frame's 600D MAC OAMP Control Opcode field 606D and MAC OAMP Control Parameters field 607D. The MAC OAMP Control Opcode field has a value of 0x0100 indicating the control frame is AIS type. The MAC OAMP Control Parameters 607D has one byte fields for MS-AIS/AIS-L 608D, AU-AIS/AIS-P 609D, TU-AIS/AIS-V 610D, and V5 AIS/AIS-DSn 611D. When AIS-L is to be indicated the value of the AIS-L field 608D can be all ones. When AIS-L is to be cleared the value of the AIS-L field 608D can be all zeros. Similarly all the other field values can be defined as is done in SDH/SONET standards.

FIG. 6E illustrates an example of a MAC OAMP RDI control frame's 600E MAC OAMP Control Opcode field 606E and MAC OAMP Control Parameters field 607E. The MAC OAMP Control Opcode field has a value of 0x0200 indicating the control frame is RDI type. The MAC OAMP Control Parameters 607E has one byte fields for MS-RDI/RDI-L 608E, HP-RDI/AIS-P 609E, LP-RDI/RDI-V 610E, RDI-DSn 611E, PDI-P 612E, and PDI-V 613E. When RDI-L is to be indicated the value of the RDI-L field 608E bits 6, 7, and 8, can have value 1, 1, and 0. When RDI-L is to be cleared the value of the RDI-L field 608E bits 6, 7, and 8 can have value 0, 0, and 0. When RDI-P is to be indicated the values of the RDI-P field 609E bits 5, and 6 can have value 0, and 1 for PLM-P; value 1, and 0 for AIS-V or LOP-P; value 1, and 1 for UNEQ-P. Similarly all the other field values can be defined as is done in SDH/SONET standards.

FIG. 6F illustrates an example of a MAC OAMP Loopback control frame's 600F MAC OAMP Control Opcode field 606F and MAC OAMP Control Parameters field 607F. The MAC OAMP Control Opcode field has a value of 0x0300 indicating the control frame is Loopback type. The MAC OAMP Control Parameters 607F has one byte fields for internal loopback 608F, and facility loopback 609F. These can also be extended to support loopbacks for regenerator/section, multiplex/line and path levels. When internal loopback needs to be activated the internal loopback field 608F can have value of all ones. When internal loopback needs to be deactivated the internal loopback field 608F can have value all zeros. Similarly values can be used for facility loopback field 609F. The MAC OAMP Control Parameters Field 607F can also include a time interval for the duration of the loopback to be active.

FIGS. 6G, 6H, GI and 6J illustrate an embodiment of control frames based on events. In this embodiment control frame opcodes are defined for individual events such as AIS-L, AIS-P, RDI-L, RDI-P, Internal Loopback, Facility Loopback, far end line PM, far end path PM, and the like. The control frame control parameters can have fields and values for the corresponding SDH/SONET Regenerator/Section, Multiplex/Line and Path functional bytes. Each NE will process the control frames that it terminates. The values of the fields can be defined same as those indicated in the corresponding SDH/SONET overhead bytes.

FIG. 6G illustrates an example of a MAC OAMP event control frame's 600G MAC OAMP Control Opcode field 606G. The MAC OAMP Control Opcode field 606G has a value of 0x0101 indicating the control frame is MS-AIS/AIS-L indicated type. Similarly for control frame opcodes can be defined to indicate events such as AU-AIS/AIS-P, MS-RDI/RDI-L, HP-RDI/RDI-P, internal loopback, facility loopback, etc.

FIG. 6H illustrates an example of a MAC OAMP event control frame's 600H MAC OAMP Control Opcode field 606H. The MAC OAMP Control Opcode field 606H has a value of 0x0102 indicating the control frame is MS-AIS/AIS-L cleared type. Similarly for control frame opcodes can be defined clear events such as AU-AIS/AIS-P, MS-RDI/RDI-L, HP-RDI/RDI-P, internal loopback, facility loopback, etc.

Figure 6I:
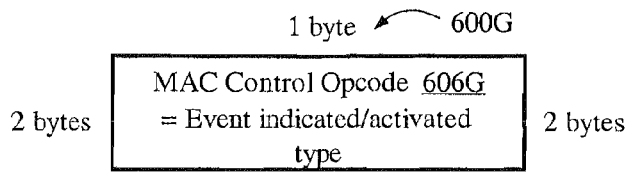
Figure 6I:
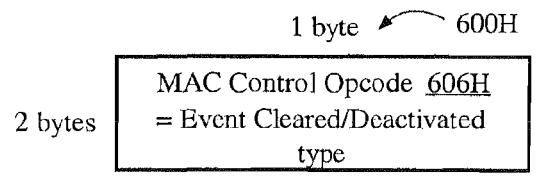
Figure 6I:
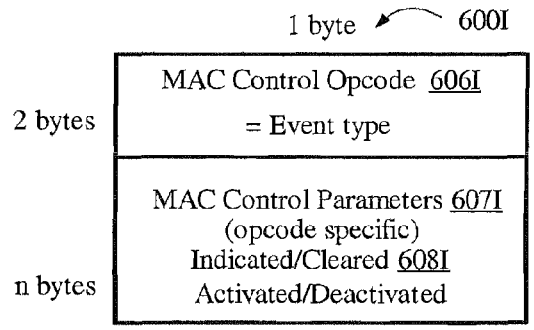

FIG. 6I illustrates an example of a MAC OAMP event control frame's 600I MAC OAMP Control Opcode field 606I and MAC OAMP Control Parameters field 607I. The MAC OAMP Control Opcode field 606I has a value of 0x0100 indicating the control frame is of AIS type. The MAC OAMP Control Parameters field 607I has one byte fields for events such as AU-AIS/AIS-P, MS-RDI/RDI-L, HP-RDI/RDI-P, internal loopback, facility loopback, and the like. The value of the fields can be used to indicate/activate or clear/deactivate events same as described in some of the previous embodiments. The field can contain values for same bytes as defined by SDH/SONET and described for FIG. 6D and FIG. 6E.

Figure 6J:
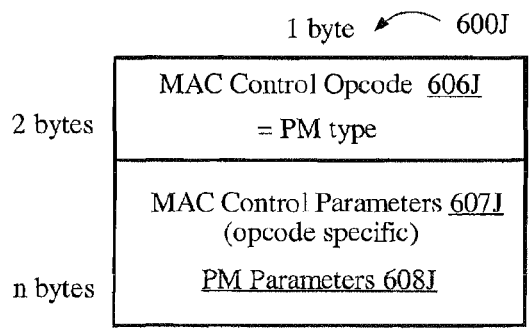

FIG. 6J illustrates an example of a MAC OAMP event control frame's 600J MAC OAMP Control Opcode field 606J and MAC OAMP Control Parameters field 607J. The MAC OAMP Control Opcode field 606J has a value of 0x0401 indicating the control frame is of far end line PM event type. The MAC OAMP Control Parameters field 607J has one byte fields for the corresponding far end line SDH/SONET bytes. The MAC OAMP Control Opcode field 606J has a value of 0x0401 indicating the control frame is of far end line PM event type. The MAC OAMP Control Opcode field 606J has a value of 0x0402 indicating the control frame is of far end path PM event type. The MAC OAMP Control Parameters field 607J has one byte fields for the corresponding far end path SDH/SONET bytes.

Similarly MAC OAMP Control Frames can be defined for wave and physical OAMP functionality. The MAC OAMP Control Frames can also be defined for new OAMP functionality that is Ethernet specific.

MAC OAMP Control Frame 600 can support additional diagnostics information such as the port id, slot id, node id, bridge id, IP address, and the like, for fault isolation and location. These can be located in the MAC OAMP Control Parameters field 607.

Figure 7:
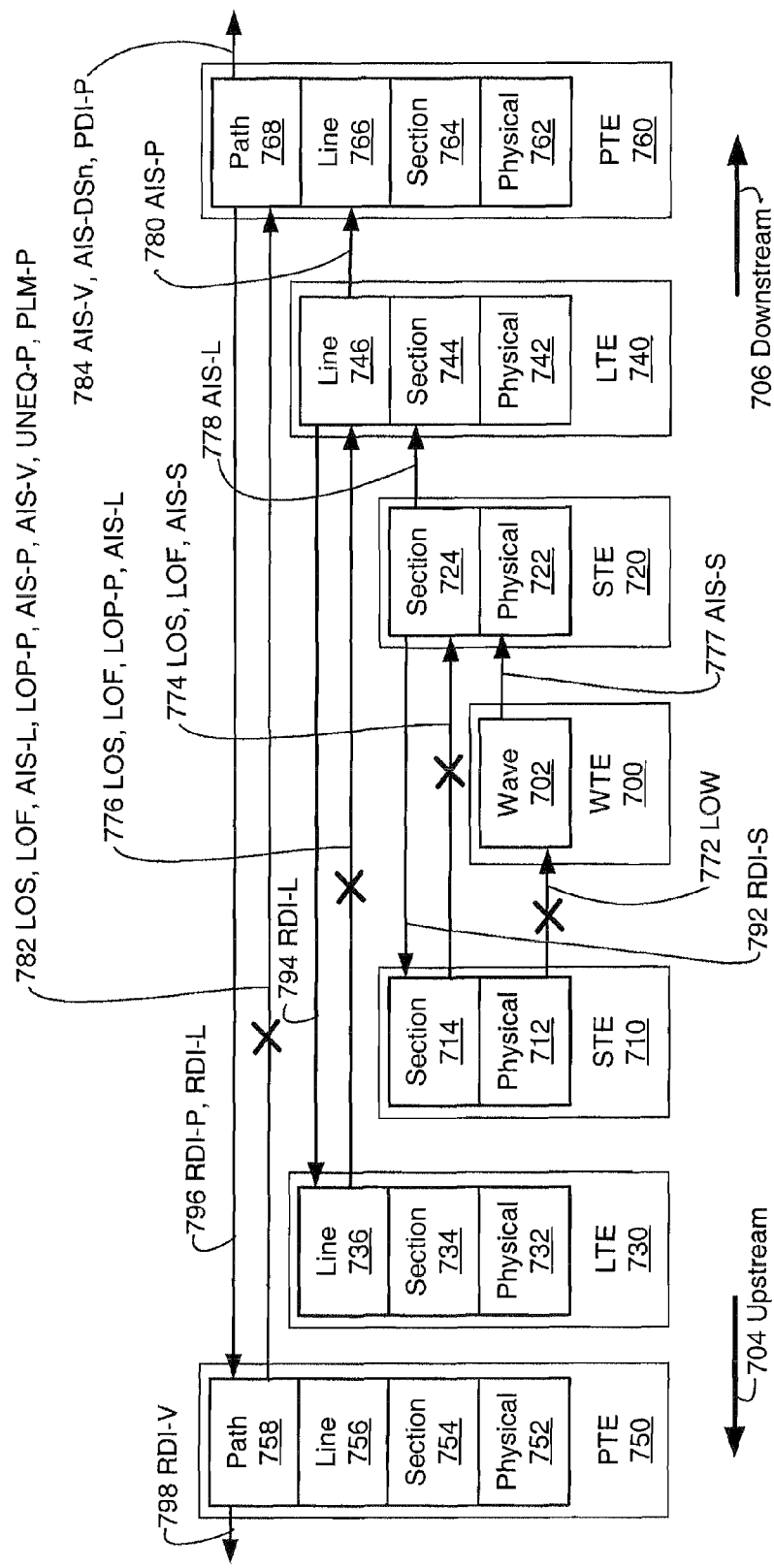
FIG. 7 is a diagrammatic illustration of an Ethernet MAC OAMP Operation according to one embodiment of the present invention.

FIG. 7 illustrates one example implementation of the Ethernet MAC OAMP Operation. FIG. 7 shows an Ethernet network of Network Elements (NE) with different terminating layers. At each layer it shows when a defect or failure condition occurs and what the response is of the NE detecting the condition and the upstream and downstream indication signals. FIG. 7 shows the implementation using SONET terms. The Ethernet MAC OAMP Operation is independent of the MAC OAMP control frame formats. Any of the above described control frame formats can be used in conjunction with the described operation implementation. The SONET to SDH mapping of events are well known in the industry. One of ordinary skill in the art will understand the applicability of the present invention described herein to SONET as well as SDH protocols.

A NE will process an OAMP control frame if it has layer level information of that lower than or equal to the termination layer level. After processing these control frames can be terminated at the NE. Alternatively, the control frames can be retransmitted or passed through to upstream or downstream NE. A NE may also be required to monitor control frame information for layers it does not terminate as required by the SDH/SONET standard. STE processes all OAMP control frames with Wave Layer, Physical Layer, and Section Layer level information. LTE processes all OAMP control frames with Wave Layer, Physical Layer, Section Layer, and Line Layer level information. PTE processes all OAMP control frames with Wave Layer, Physical Layer, Section Layer, Line Layer, and Path Layer level information. Multicast destination addressed control frames terminated/sunk at the receiving NE. If a control frame contains information at a level above the terminating layer of a NE it retransmits downstream or upstream appropriately, where they are eventually terminated at the corresponding terminating NE. Unicast destination addressed control frames are terminated at the destination NE.

The WTE 700 processes Wave Layer OAMP control frames in Wave Layer 702 context within the MAC OAMP Control Sublayer. The STE 710, and 720 processes Physical Layer 712, and 722 events, and Section Layer 714, and 724 OAMP control frames within the MAC OAMP Control Sublayer. The LTE 730, and 740 processes Physical Layer 732, and 742 events, Section Layer 734, and 744 OAMP control frames, and Line Layer 736, and 746 OAMP control frames within the MAC OAMP Control Sublayer. The PTE 750, and 760 processes Physical Layer 752, and 762 events, Section Layer 754, and 764 OAMP control frames, Line Layer 756, and 766 OAMP control frames, and Path Layer 758, and 768 control frames within the MAC OAMP Control Sublayer.

At each layer various defect or failure events can occur as shown in FIG. 7. At the Wave Layer 702 a failure can result in Loss of Wave (LOW; non-standard) condition 772 for the Physical Layer 722. At the Physical Layer 722 a failure can result in Loss of Signal (LOS), Loss of Frame (LOF) or Alarm Indication Signal-Section (AIS-S; non-standard) condition 774 for the Section Layer 724. At the Section Layer 724 a failure can result in LOS, LOF, Loss of Pointer-Path (LOP-P), or Alarm Indication Signal-Line (AIS-L) condition 776 for Line Layer 746. At the Line Layer 746 a failure can result in LOS, LOF, AIS-L, LOP-P, Alarm Indication Signal-Path (AIS-P), Alarm Indication Signal-Virtual Tributaries (AIS-V), Unequipped STS at Path Level (UNEQ-P), and Path Label Mismatch-Path (PLM-P) condition 782 for Path Layer 768.

When defect or failure conditions are detected, the NE indicates appropriate defect and alarm indication signals for upstream 704 and downstream 706 NE via MAC OAMP control frames as shown in FIG. 7. Alarm Indication Signals are sent downstream. Remote Defect Indications are sent upstream. When a WTE 700 detects a failure condition 772 it generates an Alarm Indication Signal-Section (AIS-S; non-standard) detected control frame 777 to the downstream STE 720. When the STE 720 receives the AIS-S detected control frame 777 it in turn generates a Remote Defect Indication-Section (RDI-S; non-standard) control frame 792 for upstream STE 710. When a STE 720 detects a failure condition 774 it generates an Alarm Indication Signal-Line (AIS-L) detected control frame 778 to the downstream LTE 740. When the LTE 740 receives the AIS-L detected control frame 778 it in turn generates a Remote Defect Indication-Line (RDI-L) control frame 794 for upstream LTE 730. When RDI-L is detected by LTE no AIS-P is generated. When a LTE 740 detects a failure condition 776 it generates an Alarm Indication Signal-Path (AIS-P) control frame 780 to the downstream PTE 760. When the PTE 760 receives the AIS-P control frame 780 it in turn generates a Remote Defect Indication-Path (RDI-P) or RDI-L control frame 796 for upstream PTE 750. When RDI-L or RDI-P is detected by PTE no AIS-V or AIS-DSn or PDI-P is generated. In the case of the PTE 760 also supporting Virtual Tributaries (VT) and Digital Signal-n (DS-n) it in turn generates corresponding AIS or Payload Defect Indication-Path (PDI-P) control frame 784 for downstream NE. In the case of the PTE 750 also supporting VT generates Remote Defect Indication-VT (RDI-V) control frame 798 for upstream NE.

When the failure condition is cleared the WTE 700 generates an AIS-S cleared OAMP control frame for downstream STE 720. When the STE 720 receives the AIS-S cleared OAMP control frame it in turn generates a RDI-S cleared OAMP control frame for upstream STE 710. When the failure condition is cleared the STE 720 generates an AIS-L cleared OAMP control frame for downstream LTE 740. When the LTE 740 receives the AIS-L cleared OAMP control frame it in turn generates a RDI-L cleared OAMP control frame for upstream LTE 730. When the failure condition is cleared the LTE 740 generates an AIS-P cleared OAMP control frame for downstream PTE 760. When the PTE 760 receives the AIS-P cleared OAMP control frame it in turn generates a RDI-P cleared OAMP control frame for upstream PTE 750. In the case of the PTE 760 supporting VT and DS-n it in turn generates the AIS or PDI-P corresponding control frame for downstream NE. In case of the PTE 750 also supporting VT it generates RDI-V cleared OAMP control frame for upstream NE.

When a failure is detected the OAMP Control State can be updated to indicate failure detected. When the AIS or RDI detected OAMP control frame is generated the MAC OAMP Control State can be updated to indicate that the AIS or RDI OAMP control frame was transmitted. When a failure is cleared the OAMP Control state can be updated to indicate failure cleared. When the AIS or RDI cleared OAMP control frame is generated the MAC OAMP Control State can be updated to indicate that the AIS or RDI OAMP control frame was generated.

To protect against the possibility of packet loss OAMP control frames they can be sent multiple times (3 to 5) at some initial intervals. OAMP control frames can also be sent at regular intervals while the corresponding conditions exist. They can follow the rules of Slow Protocols.

In case of SDH/SONET because of its Time Division Multiplex (TDM) nature has direct association of the overhead bytes with the channels corresponding to the port/framer that detected the failure condition. This allows for the NE to modify the corresponding overhead bytes to indicate downstream and upstream with appropriate indication signals of the failure condition. In current standard Ethernet there is no such context maintained. Ethernet MAC OAMP control frames could be flooded to all ports but that would not be an efficient method of operation. In order to be able to support OAMP operation along with the changes in the Ethernet MAC the Ethernet MAC Client also needs modification.

In order for the Ethernet MAC Client or MAC OAMP Control sublayer to know which output ports to send the AIS or RDI control frames a mapping of the ingress port where the failure condition can occur to all the egress ports or address table entries associated with traffic from the ingress port has to be maintained. There are several embodiments for implementations to maintain this association. These implementations may be specific to the way the MAC hardware is implemented. Following are few example methods of implementing the mapping.

For STE NE because by design an ingress port is typically associated with one egress port a table can be maintained such that each row is the ingress port index of the egress port field.

If a STE NE has a capability of supporting traffic from one ingress port to multiple egress ports then the NE can maintain a table of ingress port to egress port mapping. This table can be maintained efficiently by keeping a table indexed by ingress port and each row representing a word map of the size of the total number of ports architected in the NE. Each word size is determined by the size of the Address Table architecturally supported by the NE. It contains the reference count of the corresponding egress port Address Table entries that forward packets to that egress port from the indexed ingress port. When an Address Table entry has been configured (during learning or configured manually) to have traffic originating from the ingress port the corresponding word in the word map indexed by the egress port can be incremented. When the Address Table Entry is removed (during aging or removed manually) then the corresponding egress port's word in the word map is decremented. When the word field is non-zero an OAMP AIS or RDI control frame has to be generated for the egress port. If it is zero then there is no need to generate an OAMP AIS or RDI control frame. This embodiment might be preferable for multicast destination OAMP control frames because of lower overhead and cost. If Section and Line OAMP control frames use multicast then this embodiment can be used to implement STE and LTE OAMP control frames. In this method to support Path multicast OAMP control frames when a MAC Client receives a path MAC OAMP control frame on an ingress port it will process it and then forward it to the associated egress ports.

When a failure is detected on the ingress port of the STE NE, the MAC OAMP Client or the MAC OAMP Control sublayer can construct and request a multicast OAMP AIS-L control frame to be transmitted downstream. The MAC OAMP Client or the MAC OAMP Control sublayer can also construct and request a multicast OAMP RDI-S control frame to be transmitted upstream. A WTE NE handles a failure in similar manner and generate a multicast AIS-S OAMP control frame upstream.

For LTE and PTE NE one method is to maintain this information in the MAC Client Layer of an LTE or PTE. The Address Table maintained by a NE can be extended so that every forwarding Address Table Entry has an ingress port field. If not being maintained then Address Table Entry can be extended to also maintain source address of the corresponding forwarding entry.

When a failure is detected on an ingress port the MAC OAMP Control Sublayer can inform the MAC OAMP Client Layer. In case of LTE or PTE NE, the MAC OAMP Client or the MAC OAMP Control Sublayer can generate a multicast OAMP RDI-L control frame to be transmitted upstream from the ingress port. Then MAC OAMP Client can go through the Address Table and find all the Address Table Entries with the matching ingress port and can construct and request transmit downstream from the egress/forwarding port of address table entry the MAC OAMP AIS-P, AIS-V, AIS-DSn, or PDI-P Control frame based on LTE or PTE NE with the destination and source address as specified by the Address Table Entry.

In the case of PTE NE, the MAC OAMP Client also finds the Address Table Entry with the matching source and destination address and can construct and request transmit upstream from the egress/forwarding port of this address table entry the MAC OAMP RDI-P, or RDI-V Control frame based on the PTE NE type with the destination and source address as specified by the Address Table Entry. Because the RDI-P or RDI-V is sent upstream the destination address of the control frame is the source address in the address table entry and the source address of the control frame is the destination address in the address table entry of the first search described above.

For efficiency and speed, the MAC OAMP Control sublayer can also support the same functionality so that the OAMP Client does not have to get involved. This method is preferable for unicast destination OAMP control frames because it can use the unicast destination and source addresses as already maintained by the Address Table Entry. If Path OAMP control frames use unicast then this method can be used to implement Path OAMP control frames. This method can also be used for multicast OAMP control frames such that during the construction of the OAMP control frames the multicast destination OAMP control frame address can replace the unicast address. For efficiency the MAC Client can keep track of ports for which it has already generated an appropriate multicast OAMP control frame once.

Another method for LTE and PTE NE is to maintain the ingress port to Address Table Entries mapping separately. This list can be maintained as a bitmap table in which if the bit is set then it indicates that that Address Table Entry has the ingress port for incoming traffic. The ingress port can be used as the index into the table to get the corresponding bitmap. The list can be also maintained in a linked list table such that ingress port indexes into table which contains a list of all the indexes of the Address Table Entries associated with the ingress port. When an Address Table Entry is configured, the corresponding bit is set or the Address Table Entry index is placed into the list. When an Address Table Entry is removed, the corresponding bit is cleared or the Address Table Entry index is removed from the list. Once the Address Table Entry is found, then the same method as described in the previous method is used to generate the OAMP control frames.

For efficiency, a combination of the above described methods can also be used. In addition additional methods and efficiencies can be done to maintain and manage the ingress port to egress ports association and the generation of unicast or multicast OAMP control frames.

Another method is to maintain this information in the MAC Client Layer of an LTE device using multicast Address Table Entries to forward multicast OAMP control frame to the corresponding forwarding ports. The multicast OAMP control Address Table Entry can be setup whenever an Address Table Entry is added during the learning process or Address Table Entry configuration. This also works in conjunction with the reference count table. When reference count of the corresponding egress port field is zero the multicast entry is removed.

MAC OAMP Loopback control frames can be used for near end NE to request far end NE to activate/deactivate various loopbacks. One implementation of Loopback operation is such that when the NE receives a OAMP Loopback control frame with activate loopback request it processes the OAMP control frame in the MAC OAMP Control sublayer and activates the appropriate loopback. Similarly the NE can also handle the loopback deactivate request. In another implementation the MAC OAMP Control sublayer can inform the MAC Client layer which can in turn handle the loopback activate/deactivate requests. In either implementation the Ethernet NE hardware can support receiving MAC control frames while the loopback for client frames is active. The MAC control frames would typically be terminated at the receiving NE or passed through based on the specific MAC Control frame processing requirements. MAC OAMP Loopback control frames would typically be terminated at the receiving NE. The location of the loopback in the hardware is implementation specific and can be preferably in the MAC sublayer. It can also be implemented at the Physical Layer. The internal loopback can also be implemented in hardware such that the transmitted frames are looped back and transmitted to the physical medium. The facility loopback can be implemented in hardware such that the received frames are looped back and received by the MAC Client layer.

MAC OAMP Performance Monitoring (PM) control frames can be used by far end NE to convey to the near end NE far end Line, and Path PM Parameters. The far end NE can construct the OAMP PM control frame with the appropriate PM Parameters and transmit the OAMP PM control frame. Upon receiving the OAMP PM control frame the near end NE can process and update its PM statistics and counters. Also generate appropriate management/operational alarms and management information databases as necessary.

MAC OAMP control frames for other Ethernet functionality not covered by SDH/SONET OAMP standards and functionality can also be defined using this method.

When MAC OAMP Control frames are received the Upper layer MAC Client NE management software can be informed of the event so that the management software can then in turn generate a management/operational alarm to alert Network Management System (NMS) or Operational Support System (OSS).

All MACs can contain support for all layers and based on configuration be terminating equipment at any layer (STE, LTE, PTE, etc.). There is only one MAC hardware/chip, in such a configuration, and it can be used in any context. MACs can also have support for specific layers based on terminating layer. This reduces the cost of the specialized MAC hardware/chip. All functionality is optional and a MAC can support only partial functionality based on requirements, complexity, and cost.

The present invention maintains several advantages. Because it does not change the Ethernet framing, it is backward compatible and conforms to the Ethernet Standards. Because it modifies the optional Ethernet MAC Control sublayer, vendors can choose whether to implement the functionality of the present invention. The elegant design and configuration of the present invention makes implementation in the MAC hardware relatively easy. The method of the present invention is event driven, thus OAMP frames are only sent when required. Therefore, the apparatus of the present invention maintains low overhead and consumes very little bandwidth. Because it reuses standard SDH/SONET OAMP definitions and process, the implementation of the present invention is fully compliant with the SDH/SONET standard protocol. Because it supports pre-configured frames and is not head of queue blocking, the present invention can be implemented to support fast response to OAMP requests. In addition, the present invention makes use of standard SDH/SONET OAMP definitions and processes; therefore it can support OAMP operations for linear, mesh, and ring topologies, wave, physical, section, physical line, logical line, and path level OAMP operations. The invention can also support virtual tributaries, and DSn level OAMP operations.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

What is claimed is:

1. A method of providing Ethernet Operations, Administration, Maintenance, and Provisioning (OAMP) functionality on an Ethernet Media Access Control (MAC) hardware device for supporting Ethernet MAC SDH/SONET OAMP functionality by managing Wave layer, Physical layer, Line layer, Section layer, and Path layer on an Ethernet protocol network, comprising:

a near end MAC OAMP Control sublayer receiving Ethernet OAMP Client requests to be transmitted;

the near end MAC OAMP Control sublayer creating an Ethernet OAMP Control frame with requested OAMP control parameters associated with an Ethernet OAMP Client request; and the near end MAC OAMP Control sublayer transmitting the Ethernet OAMP Control frame;

wherein the Ethernet MAC hardware device provides corresponding Ethernet OAMP functionality for the Ethernet Wave layer, Physical layer, Line layer, Section layer, and Path layer in such a way that full compliance with SDH/SONET protocol OAMP functionality can be implemented on the Ethernet protocol network.

2. The method of claim 1, wherein the OAMP control parameters comprise at least one parameter of the group of parameters comprised of an alarm indicator status, remote defect indicator, Automatic Protection Switching requests, loopback requests, performance monitoring parameters, switchover requests, or various other OAMP operations information.

3. The method of claim 1, wherein the method executes within 50 ms to provide recovery functionality.

4. A method of providing Ethernet Operations, Administration, Maintenance, and Provisioning (OAMP) functionality on an Ethernet protocol network for supporting Ethernet MAC SDH/SONET OAMP functionality by managing Wave layer, Physical layer, Line layer, Section layer, and Path layer on an Ethernet protocol network, comprising of steps of:
- receiving an OAMP request from an Ethernet OAMP Client;
- creating an Ethernet OAMP Control Frame with requested OAMP control parameters included in the OAMP request; and
- transmitting the Ethernet OAMP Control Frame;
- wherein an Ethernet MAC hardware device provides corresponding Ethernet OAMP functionality for the Ethernet Wave layer, Physical layer, Line layer, Section layer, and Path layer in such a way that full compliance with SDH/SONET protocol OAMP functionality can be implemented on the Ethernet protocol network.

5. The method of claim 4, wherein the method supports SDH/SONET Overhead Bytes transparency functionality.

6. The method of claim 4, wherein the method executes within 50 ms to provide recovery functionality.

7. The method of claim 4, wherein the method provides support for standard SDH/SONET OAMP functionality for at least one topology of the group of topologies comprised of linear topologies, ring topologies, and mesh topologies for Ethernet protocol networks using SDH/SONET SOH bytes, LOH bytes, and POH bytes for SDH/SONET OAMP Signaling protocol.

8. The method of claim 4, wherein the method provides support for Ethernet OAMP functionality for at least one topology of the group of topologies comprised of linear topologies, ring topologies, and mesh topologies for Ethernet protocol networks.

* * * * *